United States Patent [19]
Brehaut et al.

[11] Patent Number: 6,132,159
[45] Date of Patent: *Oct. 17, 2000

[54] PROCESS AND APPARATUS FOR REORIENTING MEDICAMENTS TO BE COATED

[75] Inventors: Jeffrey D. Brehaut, Lititz, Pa.; Linn C. Hoover, Webster, N.Y.; Thomas Kucharski, Belle Mead, N.J.; Thomas C. Reiter, Hilton, N.Y.; David J. Revelle; Daniel A. Slater, both of Rochester, N.Y.; Luis R. Torres, Lancaster, Pa.; Patrick Vo, Basking Ridge, N.J.

[73] Assignee: Bayer Corporation, Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/275,052

[22] Filed: Mar. 23, 1999

Related U.S. Application Data

[62] Division of application No. 08/900,225, Jul. 24, 1997, Pat. No. 5,982,034.

[51] Int. Cl.⁷ .................................................. B65G 65/23
[52] U.S. Cl. ........................ 414/405; 414/764; 414/810; 414/816
[58] Field of Search .................................. 414/405, 764, 414/765, 766, 810, 816

[56] References Cited

U.S. PATENT DOCUMENTS

| | | | |
|---|---|---|---|
| 540,538 | 6/1895 | Colton | 118/28 |
| 599,865 | 3/1898 | Richards | 427/12.22 |
| 724,436 | 4/1903 | Clark | 118/30 |
| 1,115,426 | 10/1914 | Green | 118/14 |
| 1,377,644 | 5/1921 | Warrington | 34/194 |
| 2,355,643 | 8/1944 | Grover | 414/405 |
| 2,370,698 | 3/1945 | Vaughn | 414/405 |
| 2,373,721 | 4/1945 | Taylor et al. | 118/28 |
| 2,847,809 | 8/1958 | Lindeman et al. | 53/534 |
| 3,045,641 | 7/1962 | Oddo | 118/16 |
| 3,141,792 | 7/1964 | Lachman et al. | 118/697 |
| 3,453,989 | 7/1969 | Bippus | 414/764 X |
| 3,518,752 | 7/1970 | Lentz | 414/405 X |
| 3,538,997 | 11/1970 | Christine et al. | 198/867.12 |
| 3,573,966 | 4/1971 | Hostetler | 427/242 |
| 3,578,189 | 5/1971 | Yonkers | 414/816 |
| 3,896,762 | 7/1975 | Banker | 118/30 |
| 4,222,166 | 9/1980 | Kurek et al. | 29/831 |
| 4,526,129 | 7/1985 | Braden | 118/503 |

FOREIGN PATENT DOCUMENTS

| | | |
|---|---|---|
| 0 118 856 A1 | 3/1984 | European Pat. Off. . |
| 0 194 505 A2 | 2/1986 | European Pat. Off. . |
| 0 246 693 A2 | 5/1987 | European Pat. Off. . |
| 24 34 803 A1 | 2/1975 | Germany . |
| 127081 | 10/1928 | Switzerland . |
| 1537459 | 1/1990 | U.S.S.R. ................ 414/405 |

*Primary Examiner*—James W. Keenan
*Attorney, Agent, or Firm*—Orrick, Herrington & Sutcliffe LLP

[57] ABSTRACT

Medicaments on a first pallet are transferred onto a second pallet, thereby reorienting the medicaments. The first pallet is received on a first lift plate and the second pallet is received on a second lift plate in vertical opposition to the first lift plate. A lift mechanism urges the first and second lift plates towards one another and the first and second lift plates are inverted so that the medicaments are transferred from said first pallet to said second pallet.

16 Claims, 30 Drawing Sheets

U.S. PATENT DOCUMENTS

| | | | |
|---|---|---|---|
| 4,669,416 | 6/1987 | Delgado et al. | 118/503 |
| 4,684,113 | 8/1987 | Douglas et al. | 269/21 |
| 4,773,816 | 9/1988 | Fuller, Jr. et al. | 414/405 X |
| 4,820,524 | 4/1989 | Berta | 424/451 |
| 4,830,564 | 5/1989 | Walker et al. | 414/405 |
| 4,851,230 | 7/1989 | Tencza et al. | 424/467 |
| 4,867,983 | 9/1989 | Berta | 424/451 |
| 4,880,101 | 11/1989 | Wiggins | 198/403 |
| 4,921,108 | 5/1990 | Berta | 209/625 |
| 4,965,089 | 10/1990 | Sauter et al. | |
| 4,966,771 | 10/1990 | Berta | 424/478 |
| 4,990,358 | 2/1991 | Berta | 427/2.22 |
| 5,032,074 | 7/1991 | Muto et al. | 425/272 |
| 5,054,258 | 10/1991 | Tait et al. | 53/137.2 |
| 5,146,730 | 9/1992 | Sadek et al. | 53/454 |
| 5,155,981 | 10/1992 | Tordini | 53/559 |
| 5,228,916 | 7/1993 | Berta | 118/30 |
| 5,234,099 | 8/1993 | Berta | 198/867.15 |
| 5,314,537 | 5/1994 | Berta | 118/30 |
| 5,360,309 | 11/1994 | Ishiguro | 414/405 X |
| 5,391,230 | 2/1995 | Pastecki et al. | 118/503 |
| 5,436,026 | 7/1995 | Berta | 427/2.14 |
| 5,466,290 | 11/1995 | Berta | 118/20 |
| 5,498,441 | 3/1996 | Berta | 427/2.14 |
| 5,503,673 | 4/1996 | Berta | 118/16 |
| 5,514,216 | 5/1996 | Pastecki et al. | 118/503 |
| 5,607,044 | 3/1997 | Berta | 198/867.15 |
| 5,651,191 | 7/1997 | Walunas et al. | 34/236 |
| 5,993,148 | 11/1999 | Brown | 414/405 X |

PROCESS AND APPARATUS FOR REORIENTING MEDICAMENTS TO BE COATED

This application is a divisional of copending application Ser. No. 08/900,225 filed on Jul. 24, 1997, now U.S. Pat. No. 5,982,034.

FIELD OF THE INVENTION

The present invention relates to a process and apparatus for the gelatin coating of medicaments.

BACKGROUND OF INVENTION

Many products, including prescription drugs, over the counter drugs (e.g., analgesics) and vitamins, come in a solid dosage (i.e., "medicament") form. Two common shapes for these medicaments are referred to as "tablets" and "caplets". Tablets are generally disc-shaped having a diameter that is greater than their height. Caplets are elongated shapes having a longitudinal axis that is greater than the greatest thickness of the medicament along the longitudinal axis, typically by approximately 2.5 times. Both usually include rounded ends and edges and a flat surface corresponding to the walls of the die in which the mixture of ingredients are pressed into the particular solid dosage form. The flat area is sometimes referred to as a sidewall and can form a corner or edge relative to the two sides on opposite sides of the sidewall.

A common problem with both caplets and tablets (collectively "medicaments") is the texture or feel of their surfaces. Without any outer coating, both forms have a "chalky" texture formed by the compressed mixture. Research has established that some people believe uncoated medicaments are difficult to swallow. Research also has found, however, that people believe that medicaments having a gelatin or similar coating are significantly easier to swallow. Accordingly, many such processes have been developed and are known in the art.

One such process, disclosed in U.S. Pat. No. 599,865, utilizes a bar or plate which has been coated with a cleanly separable adhesive preparation, such as a combination of beeswax and rosin. Medicaments to be coated are pressed onto the adhesive and partially dipped into a coating mixture. The medicaments may then be dried and pressed onto a second adhesive coated bar or plate so that the remaining portions of the medicaments may be dipped.

U.S. Pat. No. 540,538 discloses a machine for dipping medicaments which utilizes a plate having countersunk holes to retain tablets by the application of a vacuum through the holes. The plate is placed over a vacuum box and medicaments are placed in each hole. A vacuum is then applied and the box and plate are inverted, thereby allowing the medicaments to be dipped in a coating bath. Once the medicaments have been dipped, the box is returned to its upright position, the vacuum is removed and the plate is manually removed, with the medicaments in place, to allow drying of the coating. After drying, the medicaments may be transferred onto a second plate with their uncoated sides exposed by manually placing the second plate over the medicaments contained on the first plate and flipping the two plates over. The uncoated sides may then be coated as described above.

Another process, disclosed in Japanese Patent Publication No. 41-13997, utilizes rigid tubes to retain tablets on their ends by the application of a suction force through the tube center. After dipping the tablets to approximately their midpoints and drying, the tablets are inverted and transferred onto opposing tubes. The vacuum is then switched from the first set of tubes to the second thereby exposing the uncoated portions of the tablets to be dipped. A drawback of this system is that no means is provided to easily center the tablets on the tubes.

U.S. Pat. No. 2,373,721 refers to a system for coating medicaments in which the medicaments are held over a coating tank in an inverted orientation by suction tubes. Cups slightly larger than the individual medicaments are then raised from an initial position, submerged in the coating, to immerse the individual medicaments in coating material contained within the cups.

U.S. Pat. No. 4,965,089 refers to the use of a caplet holding plate having sets of caplet gripping collets on both sides thereof. Caplets, initially disposed on one side of the plate, are dipped in a gelatin coating on one end then pushed through the plate so that the other side of the caplet may be coated. The disadvantages of such a system are that the caplet holding plate is not suitable for coating tablets having a height substantially less than their diameter. In addition, the coated surface may be damaged when pushed through the collet to the other side of the caplet holding plate.

U.S. Pat. No. 5,228,916, refers to the use of moveable vacuum tubes, which extend through a carrier plate, to secure tablets to be dipped. Such a process is not, however, well suited for coating caplets whose ends may not be readily secured to a vacuum tube. In addition, the use of multiple moveable vacuum tubes makes it difficult to maintain the tablets centered on the vacuum tubes in a level plane parallel with the surface of the coating in which the tablet is to be dipped. It is, therefore, difficult to obtain a level transition line when coating tablets with more than one color coating.

Therefore, there exists a need for a medicament coating system which may be easily adapted to coat medicaments of different sizes and shapes and which produces a uniform coating with no damage to the finished product.

SUMMARY OF THE INVENTION

It is, therefore, an object of the present invention to provide a method and apparatus for coating medicaments to produce a uniform, undamaged coating.

A further object of the present invention is to provide a method and apparatus for coating medicaments which may be easily adapted to coat medicaments of different sizes and shapes.

Still another object of the present invention is to provide an apparatus to secure medicaments to a pallet in a level orientation such that the pallet may be inverted and the medicaments dipped in a coating mixture.

Yet another object of the present invention is to provide a method and apparatus to evenly and quickly dry a coating once it has been applied to a medicament.

The above and other objects are achieved in accordance with a first aspect of the present invention by an apparatus comprising a continuous conveyer system to advance a plurality of pallets through the sequence of stations at which the steps necessary to dip and coat each side of a medicament with a coating are performed. The stations of the system include a loading station, at least one dipping station, at least one dryer station, a reorientation station and an unloading station.

Medicaments to be coated are loaded into pallets with a first portion of the medicaments exposed at the loading station. The pallets are oriented in an upright position so that the medicaments extend above the surface of the pallet. After a pallet is loaded, it proceeds along the conveyer to the first dipping station. At the first dipping station, a vacuum is applied to the pallet to secure the medicaments to the pallet and the pallet to the end effector tooling of a robot arm. The pallet is then inverted and the first exposed portion of each of the medicaments is dipped into a bath to coat the exposed end. The dipping step has a first dipping profile of insertion rate and depth, dwell time in the bath, and removal rate to control the coating on the medicament. Preferably, the bath is a gelatin or a gelatinous bath for gel coating the medicament.

After the dipping step, the pallet is returned to its upright position on the conveyer, and the vacuum is removed. The pallet is then advanced to the dryer station, where the coating is dried. The dryer station includes a series of conveyors similar to those which transport the pallets between the different stations. The dryer conveyors transport the pallets through at least one, and preferably two drying rooms. The drying rooms have a controlled environment and vertical air flow plenums over each conveyor section. The air plenums are disposed horizontally over the path of the pallets and include rows of air directing apertures, preferably in a sinusoidal arrangement, running in the direction of product flow for directing a flow of air onto the medicaments. When the pallets exit the dryer station, the coating on the first exposed portion of the medicaments has been fully dried.

The pallets are then passed to the reorientation station where the partially coated medicaments are transferred from the first pallet to a second pallet to expose the uncoated ends. The second pallet is identical to the first pallet. The transfer is accomplished in the reorientation station by indexing the first pallet under the second pallet, which is in a face-down orientation. The two pallets are then urged against a transfer plate to form a sandwich, which is then rotated 180° to invert the pallets so that the medicaments free-fall downward from the first pallet, through apertures in the transfer plate, into the medicament receptacles of the second pallet, leaving a second portion of the medicaments exposed. The first pallet, now empty and in a face down orientation, remains in the reorientation station to be the "second" pallet for the next full pallet entering the reorientation station.

The second pallet, now loaded, is then ejected or withdrawn from the reorientation station and advanced to a second dipping station. The second dipping station operates in the same manner as the first dipping station except that it may have a second dipping profile that is different from the first dipping profile. Preferably, the dipping profiles are identical. Thus, the second exposed portion of the medicaments is dipped in the same manner as the first portion. Preferably, the second dipping station has a bath of similar material to the bath of the first dipping station, more preferably a gelatin or gelatinous bath of the same color or a different color as that of the first dipping station. It also should be understood that the first and second dipping stations, in one embodiment, could use a common bath and in another embodiment, could use baths of different types of materials.

After the second coating has been applied, the second pallet is advanced through the dryer station in the same direction as occurred after the first coating. At the exit of the dryer station, the medicaments are fully dried and are sent to the unloading station where the coated medicaments are ejected from the pallet. It should be understood that the conveyor system can be a series or a plurality of conveyors that transfer the pallets along and between the stations.

In a second aspect of the invention, an apparatus to hold the medicaments to be coated is provided. In one embodiment, the apparatus comprises pallets that include a plate-like support member, on which rests a resilient and deformable mat having a rectangular array of medicament receptacles. The surface of the support member that abuts the mat contains a matrix of very fine grooves that provide channels for communication of a vacuum. These channels are connected to centrally located holes or apertures, e.g., three, extending through the support member. These holes can be coupled to a vacuum source, e.g., in the end effector of a robot arm capable of engaging the pallets and inverting them for dipping in the bath.

One such mat is configured with receptacles for medicaments that are tablets. This mat has raised hollow tubular portions that provide holes through which the vacuum can act to hold tablets seated on the tubular portion. In this embodiment, each tubular portion holds only one tablet at a time by resting the tablet upon the top end portion of the tube. The mat also includes portions that project upwardly from the mat, adjacent to and around the upwardly extending tubular portions. These projections serve as rests and guides to support and center each of the tablets on a tubular portion in the absence of any vacuum holding the tablet thereon. These projections are mounted on compliant diaphragm portions of the mat. When the vacuum is applied to secure the tablet to the tubular portion and hence the mat, the diaphragm portions flex and the support projections are deflected away from the tablet, which remains centrally contained within the receptacle. When the vacuum is removed, the diaphragms return to their normal position and the projections will support the tablet so that it will not fall off the tubular portion.

Another such mat is configured for medicaments that are caplets. In this embodiment, the medicament receptacles of the caplet mat do not have holes through the mat, but instead, include small compartments formed by raised portions in the mat. These raised portions form the walls of the caplet-holding compartments. These walls are mounted on compliant diaphragm portions of the mat such that when the vacuum is applied, the diaphragms flex and the walls are deflected toward the caplet contained within the receptacle. This action results in securing the caplets to the mat. It also results in straightening the caplets in the pallet, thereby to provide them with a relatively uniform orientation for dipping.

In another aspect of the present invention, an improved apparatus for drying the coated medicaments is provided. The improved drying means includes air directing plates under which the medicaments to be dried are passed. Each air directing plate has at least one row of air directing apertures arranged in a sinusoidal layout running in the direction of product flow.

Preferably, the air directing apertures are directed normal to the plane of the pallets and there is approximately one row of apertures corresponding to, and parallel with, each row of medicaments on the pallets passing thereunder. An air plenum is used to force air through the air directing plates as the coated pallets pass thereunder. This results in a wash of air that swirls around the coated medicament as the medicament moves through the drying section, and provides an effective drying of the coated medicaments, particularly gelatin coated medicaments.

These and other objects, features and advantages of the present invention will be apparent and fully understood from the following detailed description of the preferred embodiments, taken in connection with the appended drawings.

BRIEF DESCRIPTION OF THE DRAWINGS

The present invention can be better understood when considered with the following drawings in which like reference numerals refer to like elements and in which.

DETAILED DESCRIPTION OF THE PREFERRED EMBODIMENT

The system for coating medicaments according to the present invention comprises two major sections. One section, the Carrier Handling System (CHS), is shown on the right side of FIG. 1 and the second section, known as the Automatic Drawdown System (ADS), is shown on the left hand portion of FIG. 1.

In the preferred embodiment, the medicaments are dip coated with a gelatinous or gelatin material, as is discussed below. However, it should be understood that this invention is applicable to dip coating medicaments with materials other than gelatin and gelatinous materials, as will be appreciated by a person of ordinary skill in the art.

Further, in the preferred embodiment, the medicament is preferably acetylsalicylic acid (commonly known as ASA and by its trademark ASPIRIN) and preferably has been spray-coated with a subcoating. It should, nevertheless, be understood that the present invention is applicable to dip coating medicaments having a composition other than ASA and the particular disclosed subcoating. For example, other analgesics such as acetaminophen, ibuprofin, ketoprofin and combinations thereof, alone or together with one or more other active ingredients such as decongestants, antihistamines, expectorants, caffeine, sleep-aids, as well as inactive ingredients and excipients, as well as other over the counter and prescription or ethical pharmaceutical products or nutritionals could be used.

The currently preferred subcoating is applied in a conventional one-step spraying operation and consists of a water soluble film former (hydroxypropyl methylcellulose (HPMC)), a slightly soluble plasticizer (triacetin), and a hydrophobic surfactant (sorbitan trioleate). A suitable formulation for the subcoating is given in Table 1.

TABLE 1

SUBCOATING FORMULATION

| Raw Material | % of Raw Material |
|---|---|
| hydroxypropyl methylcellulose (HPMC) | 82.12 |
| triacetin | 16.42 |
| sorbitan trioleate | 1.46 |

After the subcoating has been applied, the medicaments are "conditioned" by placing them in a bin and exposing them to compressed air. In the preferred embodiment, the bin is closed, but not sealed and includes one or more air distribution wands to which a compressed air source may be attached. Each distribution wand is essentially a pipe having a plurality of holes along its length to distribute the compressed air throughout the bin. The compressed air is at ambient temperature and supplied to the bin so as to provide a positive pressure in the bin. At the end of approximately 24 hours of exposure to the compressed air, the medicaments are sampled and the moisture content analyzed. Provided the moisture content is verified to be below a predetermined level (i.e., 1.5%) the medicaments are sent to the loading station to be loaded onto the pallets as described below.

The Carrier Handling System (CHS)

Figure 1:
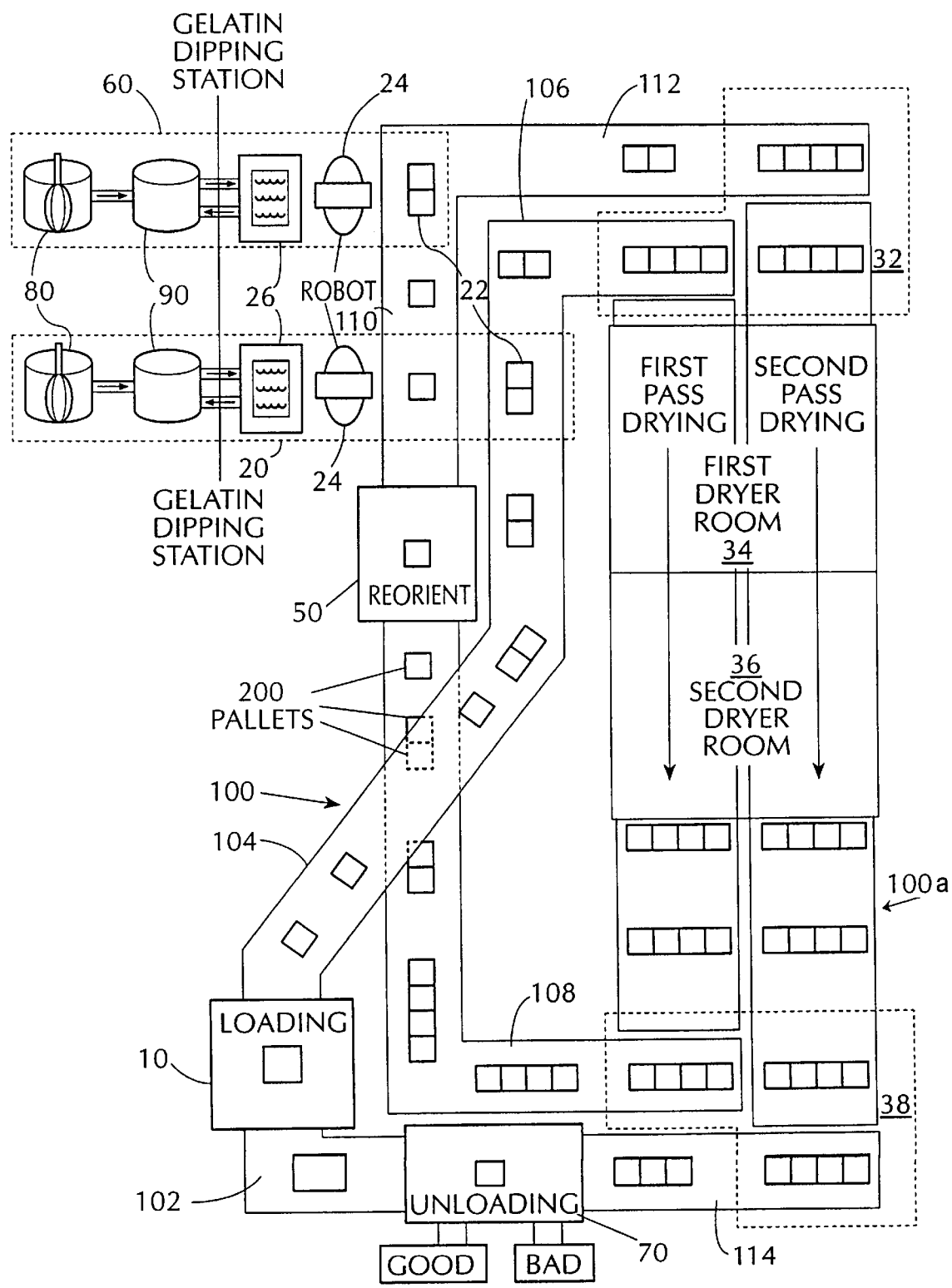
FIG. 1 is a top view of the system for the dip coating of medicaments in accordance with a preferred embodiment of the present invention.

The major components of the CHS, as illustrated in FIG. 1, are a loading station 10, a first dipping station 20, a dryer station 30, a reorientation station 50, a second dipping station 60, and an unloading station 70. Medicaments are transported between the above stations by a conveyer system 100. The conveyer system 100 is comprised of flexible plastic links and is designed for 24 hour a day operation. Preferably, the conveyor system 100 is actually a series of separate conveyor belts that, together with the various operating stations, form a continuous path. One suitable conveyor system is to use the known conveyor systems for transporting cases of carbonated beverages.

The medicaments are carried on the conveyer system 100 by specially designed pallets 200 which are adapted to hold the medicaments when inverted through the application of a vacuum.

The Pallets

Referring to FIGS. 2–11, the pallets 200 used in the system of the current invention to transport the medicaments between stations include a plate-like support member 210, on which rests a mat 270 (or 240) having a rectangular array of receptacles 272 (or 230) designed to receive the medicaments. Because of the differences in geometry, the tablet mats 240 (FIGS. 4–7) differ in design from the caplet mats 270 (FIGS. 2 and 8–11), but in both cases the support member 210 is identical. In the preferred embodiment, the mats 240 and 270, are formed of rubber, however, other resilient, impermeable materials may be used, e.g., silicone.

Figure 2:
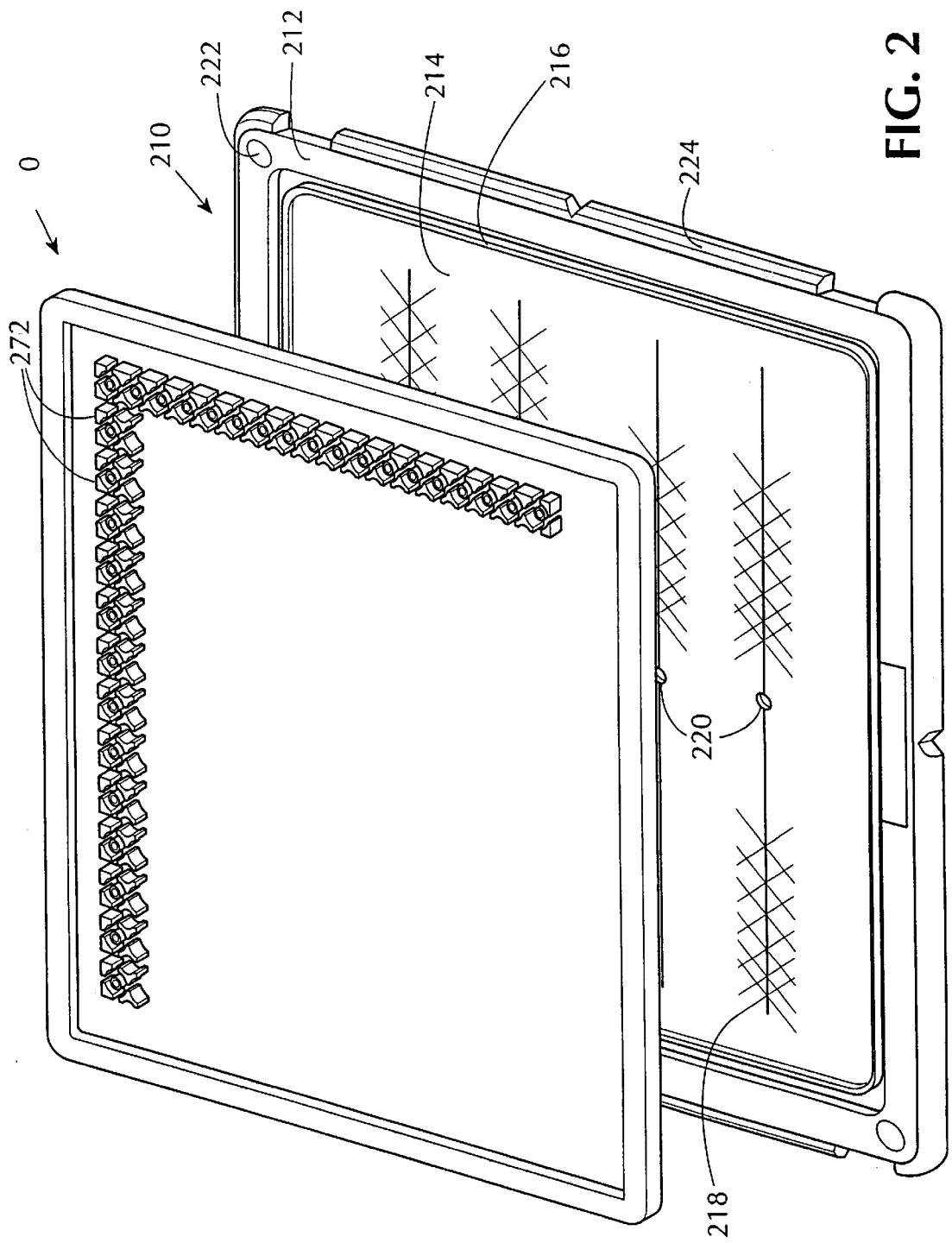
FIG. 2 is an exploded perspective view of a pallet in accordance with a preferred embodiment of the present invention.
Figure 3:
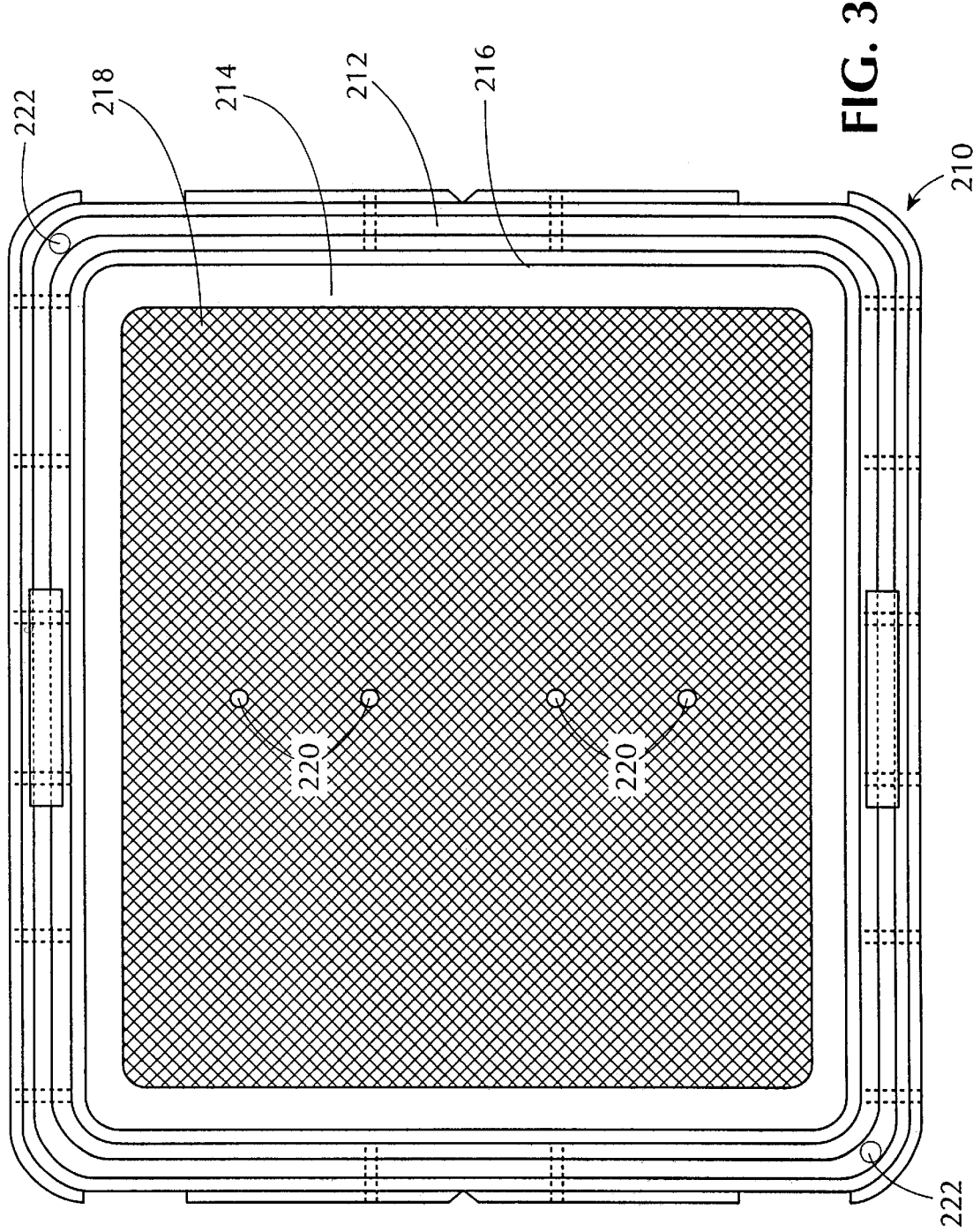
FIG. 3 is a top view of the support member of the pallet of FIG. 2.
Figure 3A:
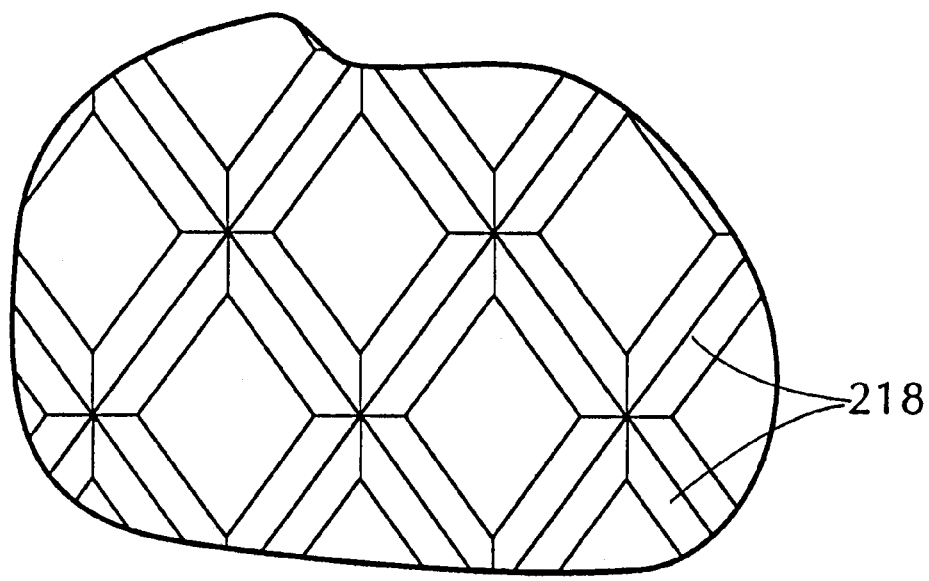
FIG. 3A is a partial top view of the grooves of the support member of FIG. 3.
Figure 3B:
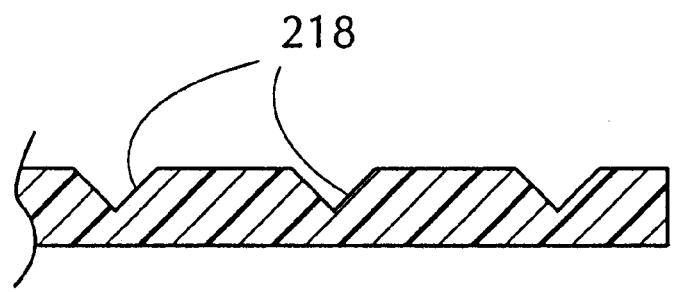
FIG. 3B is a partial cross-sectional view of the grooves of the support member of FIG. 3.

Referring to FIGS. 2–3B, the support member 210 is preferably a rectangular tray having a rim 212 around its perimeter and a flat receiving surface 214 within the area defined by the rim 212 for receiving the mat 240 or 270. The mat 240 or 270 rests on the receiving surface 214 of the support member 210. A rib 216 is integrally formed on the receiving surface 214 of the support member 210 just inside the rim 212. Rib 216 extends around the perimeter of the support member 210 and fits within a corresponding sealing channel 232 formed in the mat to provide a substantially air tight seal therebetween. (See FIGS. 6, 7, 10 and 11). It is important that the mat 240 or 270 be seated squarely in support member 210 so that the receptacles 230 or 272 are in a substantially rectangular array of straight lines, and not curved, which could adversely affect the ability to fill the pallet with medicaments. This adjustment may be made by manual manipulation of the mat.

The receiving surface 214 of the support member 210, which abuts the mat 240 or 270, contains a matrix of very fine grooves 218, which are formed in the process of molding the support member 210. These grooves 218 provide channels for communication of a vacuum. As best seen in FIGS. 3–3B, the grooves 218 of the preferred embodiment have a triangular cross-section, are approximately 0.015" deep and 0.030" wide, and are in a cross-hatched arrangement with approximately 0.090" between adjacent groves. The grooves 218 are connected to four centrally located holes 220 which extend through the support member 210 to which a vacuum may be applied.

In the preferred embodiment, the support members 210 are formed of a rigid plastic, such as polycarbonate, so as to be dimensionally stable in the operating environment of the CHS and to not warp to any significant degree, despite repeated use and thermal cycling. It should, however, be apparent to one skilled in the art that other materials, such as steel or aluminum, could be used. In addition, other groove configurations and other means of communicating the vacuum across the receiving surface of the support member may be used so long as the support member 210 provides support to the mats at the required locations. One example of an alternative embodiment would include raised members strategically placed on the receiving surface of the support tray to allow deflection of the diaphragm portions of the mat while, in the case of the tablet mat, simultaneously supporting the tubular sections and allowing the vacuum to be communicated through their center apertures. (See description of mats 240 and 270 below).

The receptacles in the tablet mat 240, illustrated in FIGS. 4–7, consist of raised tubular portions 242 that provide holes 243 through which a vacuum can act. Each tubular portion 242 holds only one tablet at a time by resting the tablet upon the top end 244 of the tubular portion 242. (See FIG. 6.) The bottom end 246 of the tubular portion 242 rests on the receiving surface 214 of the support member 210 and is aligned with at least one of the grooves 218 therein. Accordingly, when a vacuum is applied to the support member 210 at holes 220, it is communicated through the grooves 218 to the tubular portions 242 of the mat 240 to secure the tablets 204 to the mat 240. (See FIG. 7). Because the bottom ends 246 of tubular portions 242 are in contact with the receiving surface 214 of the support member 210, the tubular portions 242 do not move in a direction perpendicular to the receiving surface 214.

Figure 6A:
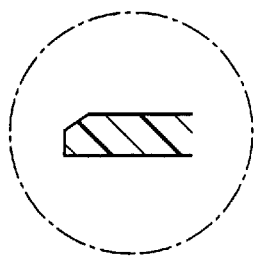
FIG. 6A is a partial cross-sectional view of the tubular portion of the tablet mat of FIG. 6.
Figure 6:
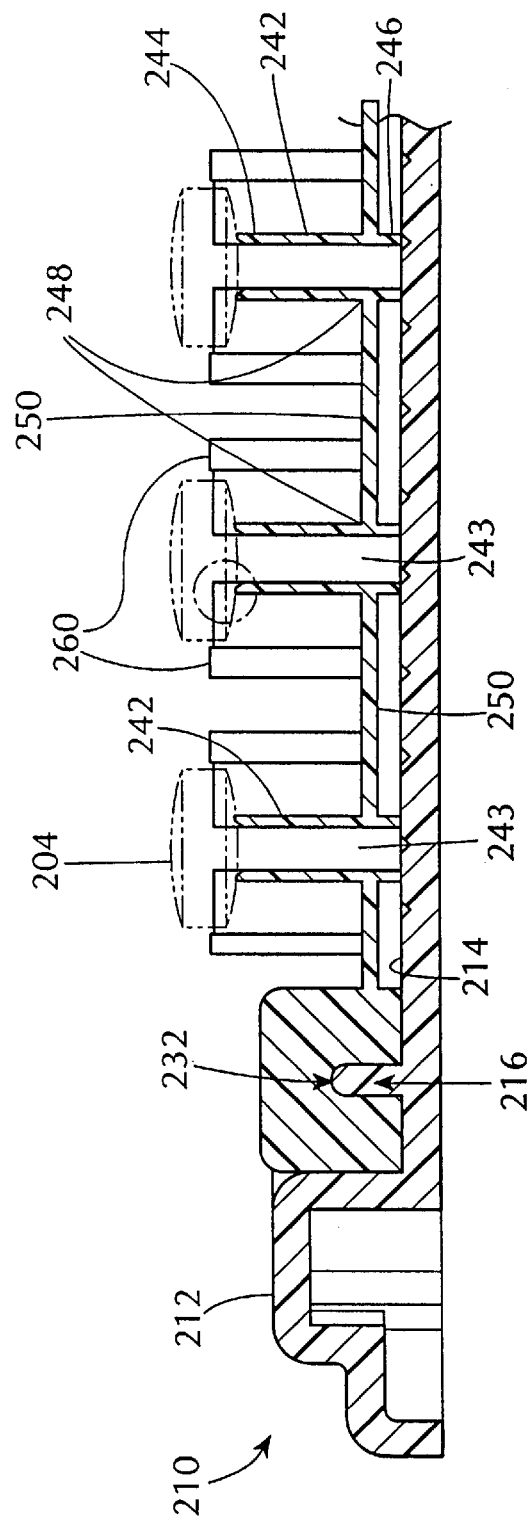
FIG. 6 is a partial cross-sectional view of the tablet mat and support member of FIG. 4.

In the preferred embodiment, the tubular portions have an outer diameter of 0.200" and an inner diameter of 0.120". Thus, each tube wall is approximately 0.040" thick. At the top end of each tubular portion, the inner 0.030" is angled inward at 45°. (See FIG. 6A).

The tubular portions 242 of the mat 240 are integrally connected to compliant diaphragm portions 250 of the mat 240 at a point 248 between the bottom end 246 and the top end 244 of the tubes 242. Thus, the compliant diaphragm portions 250 are held at a distance away from the receiving surface 214 of the support member 210. (See FIGS. 6 and 7). The compliant diaphragm portions 250 of the mat 240 are further arranged so that each compliant diaphragm portion 250 is aligned with at least one groove 218 in the receiving surface 214 of the support member 210.

The tablet mat 240 also includes guide portions 260 that project upwardly from the mat (i.e., away from the support member 210), adjacent to the upwardly extending tubular portions 242. These projections 260 serve as guides or stabilizing elements to center each of the tablets 204 on one of the tubular portions 242. Preferably, there are four such projections spaced at 90° around the tubular portions, although more or fewer projections could be used. The spacing of the guide portions 260 is determined by the size and shape of the tablets to be coated. In the preferred embodiment each group of four projections defines a circular tablet receptacle with an inner diameter of 0.436". In an alternate example, five projections are used, particularly if the medicament has a hexagonal shape.

Figure 7:
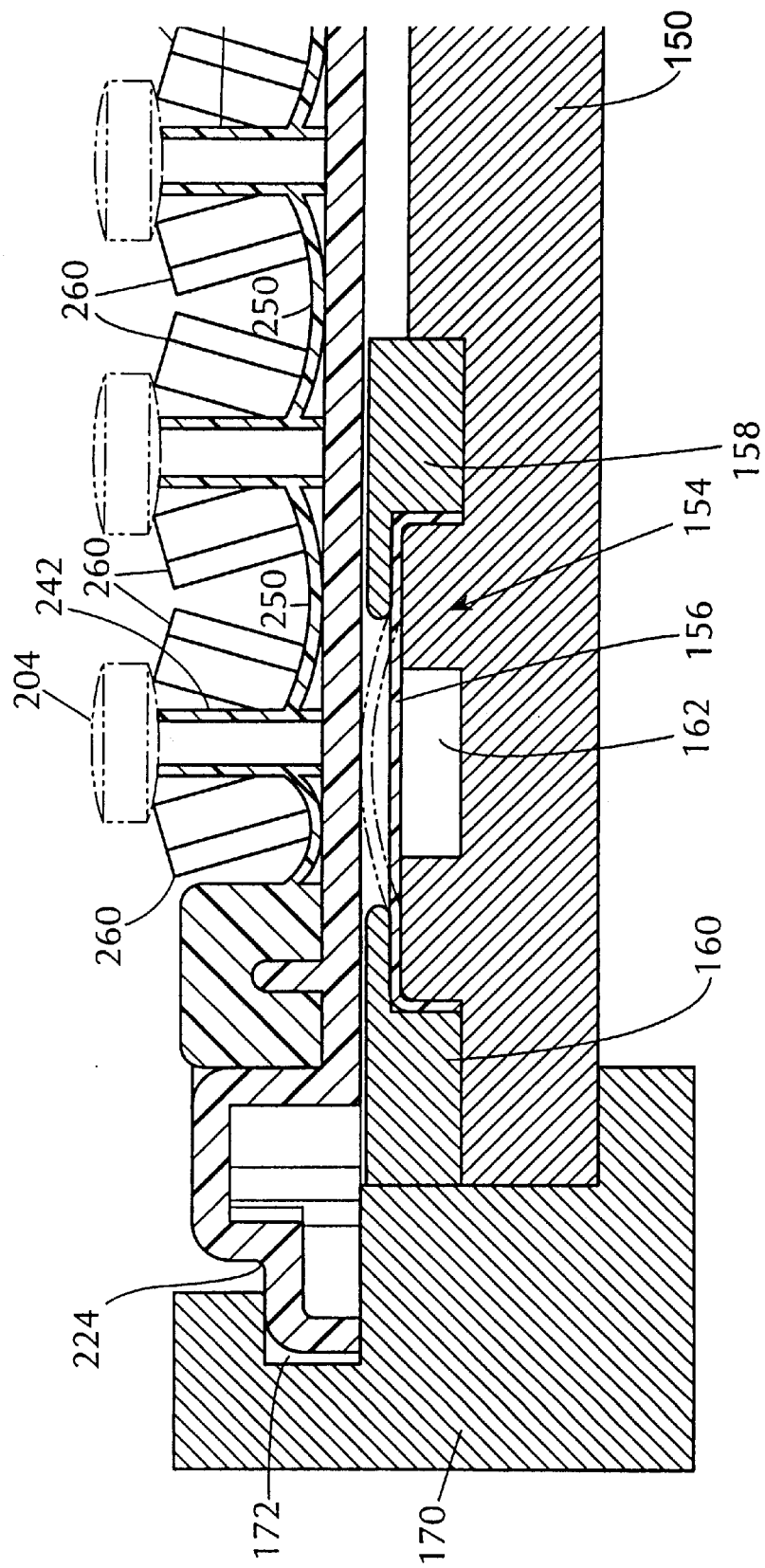
FIG. 7 is a partial cross-sectional view of the tablet mat and support member of FIG. 4 with a vacuum being applied by the end effector tooling in accordance with a preferred embodiment of the present invention.
Figure 8:
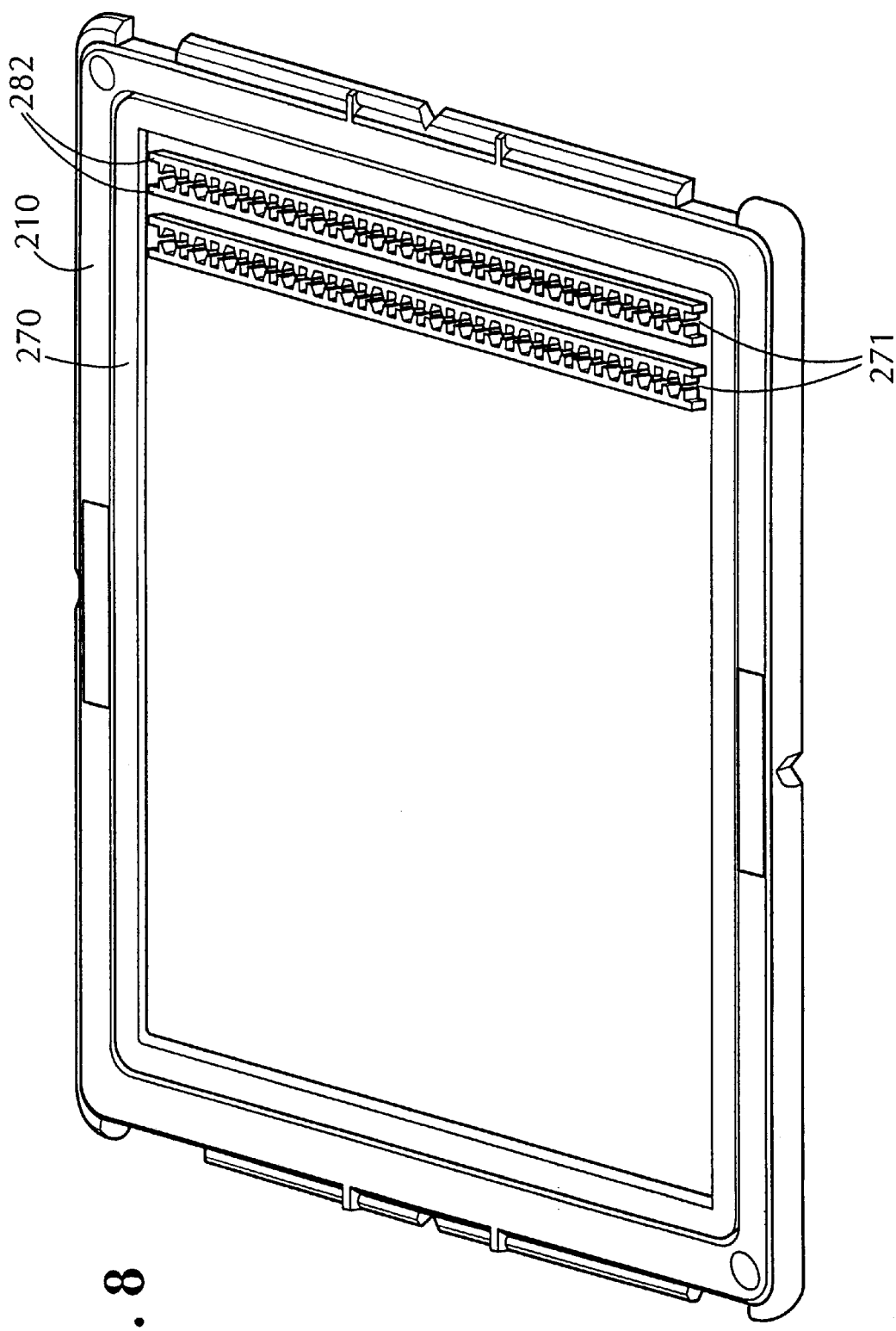
FIG. 8 is a perspective view of a caplet mat and support member in accordance with a preferred embodiment of the present invention.
Figure 9:
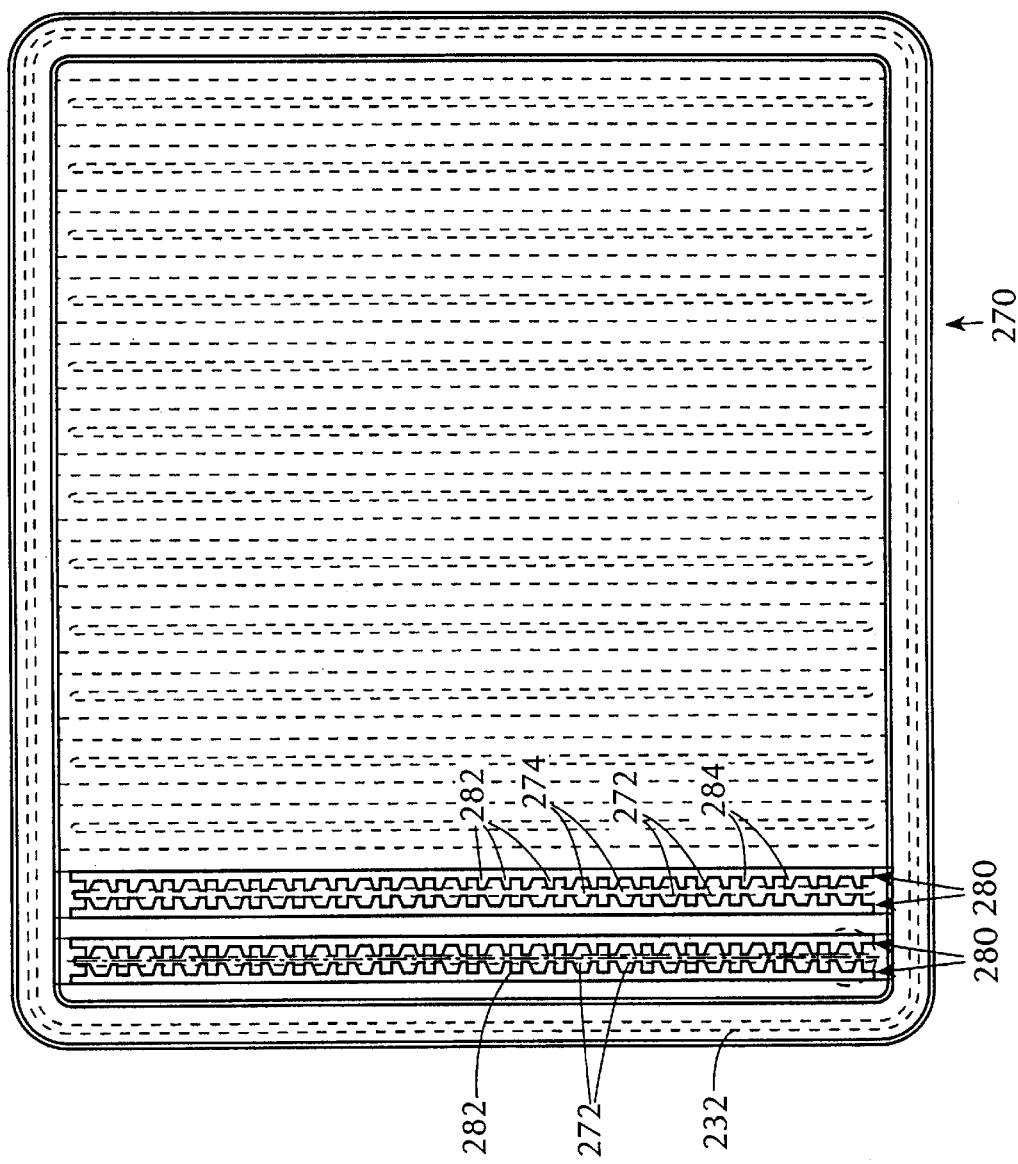
FIG. 9 is a top view of the caplet mat of the pallet of FIG. 8.

To ensure complete coverage of the tablets 204 by the coating, the guide portions 260 are mounted on the compliant diaphragm portions 250 of the mat 240. Thus, as illustrated in FIG. 7, when the vacuum is applied to secure the tablets 204 to the tubular portion 242, the compliant diaphragm 250 is simultaneously drawn toward the support member 210, thereby deflecting the projections 260 radially away from the tablet 204 and somewhat downwardly. This action exposes a retained tablet.

Figure 4:
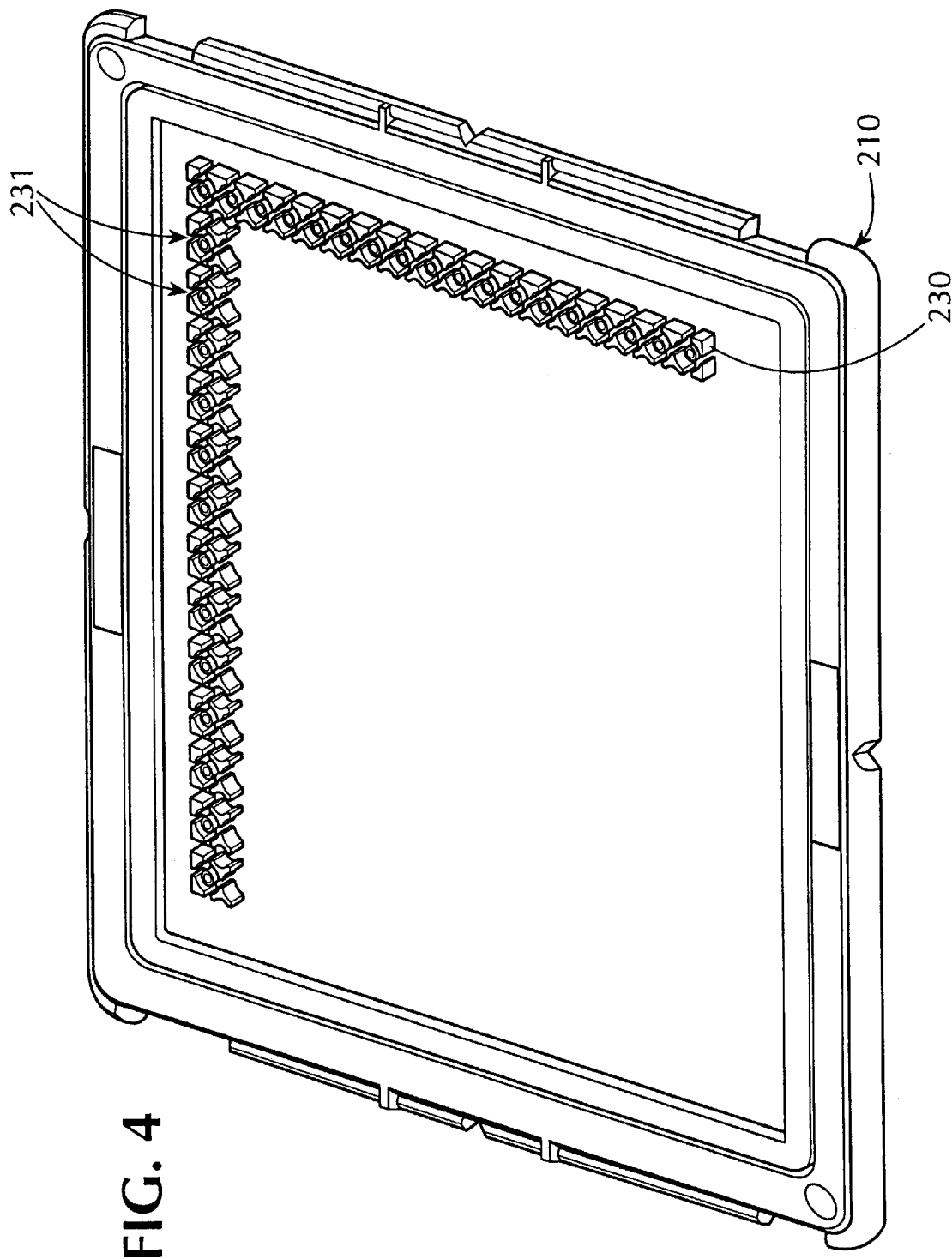
FIG. 4 is a perspective view of a tablet mat and support member in accordance with a preferred embodiment of the present invention.
Figure 5:
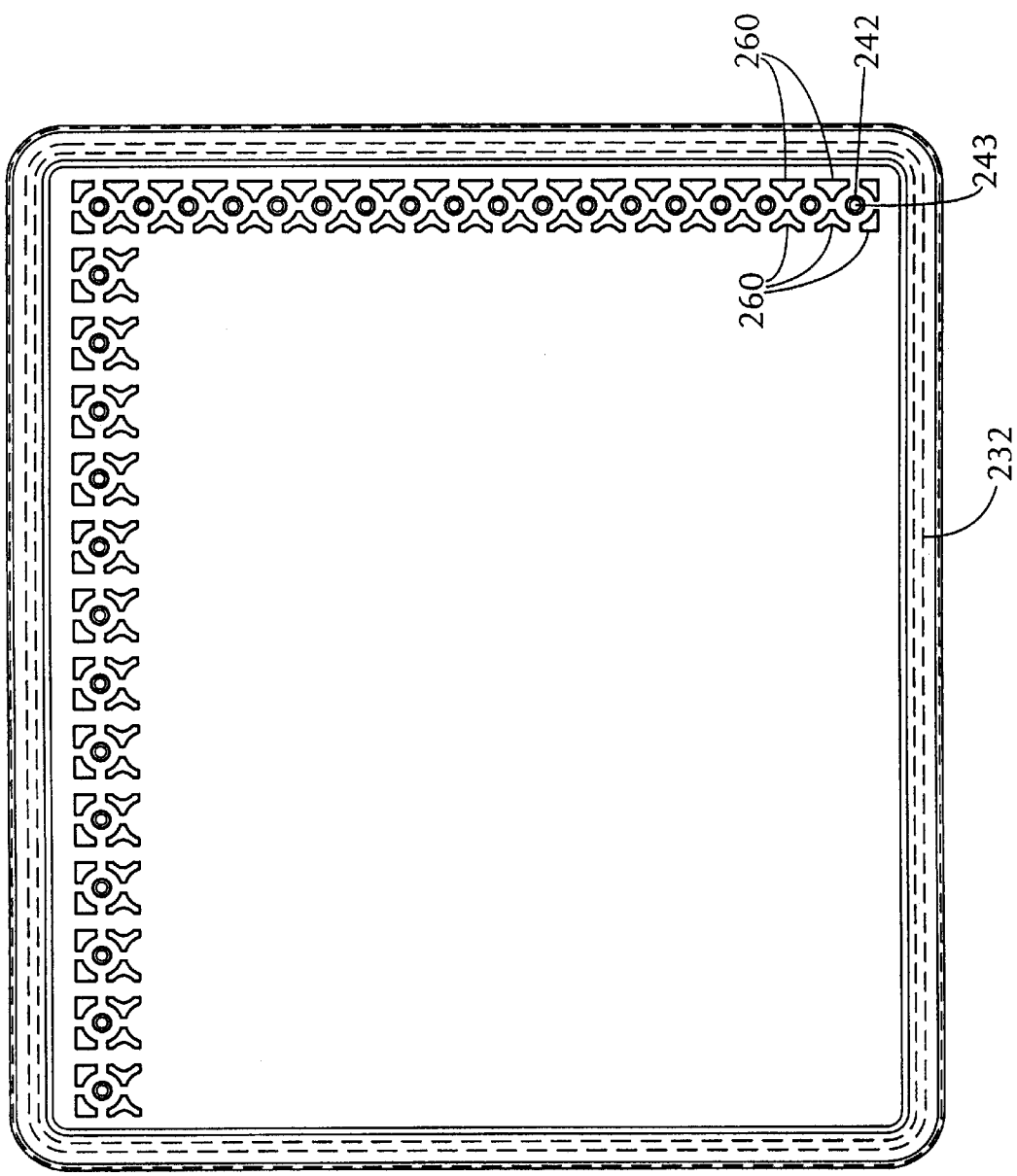
FIG. 5 is a top view of the tablet mat of the pallet of FIG. 4.

In the illustrated embodiment, the tablet receptacles 230 are arranged in a plurality of rows 231 best seen in FIGS. 4 and 5, each spaced approximately 0.743" center-to-center from the adjacent row 231 of receptacles 230. Receptacles 230 within a row 231 are spaced approximately 0.495" center-to-center from the adjacent receptacles. This close spacing within each row 231 is accomplished by forming adjacent guide projections 260 as a single piece. It should, therefore, be apparent that when deflected, the shared guide projections 260 are deflected primarily towards the adjacent row 231 of receptacles 230.

The pallet used to transport the caplets is similar to the pallet used for tablets. The caplet pallet employs an identical plate-like support member 210, on which rests a somewhat different mat 270 (shown in FIGS. 2 and 8–11) having a rectangular array of receptacles 272. In this case, there are no holes through the mat 270. Instead, the receptacles consist of small compartments 272 formed by raised gripping portions 280 formed on the top surface of the mat 270. These gripping portions 280 form the walls of the caplet-holding compartments 272.

In the preferred embodiment, the gripping portions 280 are formed by raised gripping ribs 282 which are integrally formed with and run along the length of the caplet mat 270. Pairs of adjacent gripping ribs 282 include a plurality of gripping fingers 284, each gripping finger 284 being integrally formed with one of the gripping ribs 282 and the mat 270, extending toward a corresponding gripping finger 284 on the opposing gripping rib 282. These gripping fingers 284 divide the regions between adjacent gripping rib pairs 282 alternately into caplet-holding compartments 272 and drop tube receiving compartments 274.

Figure 10:
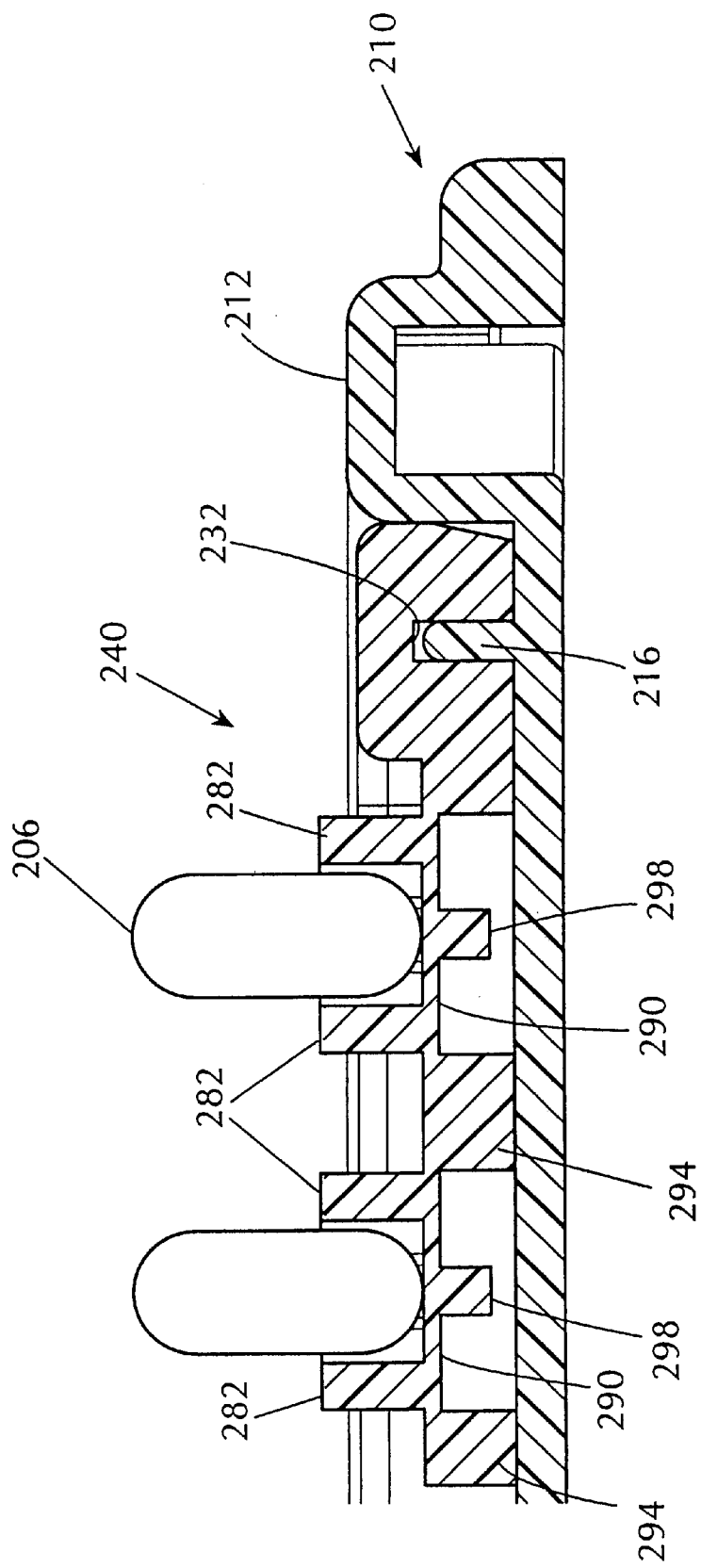
FIG. 10 is a partial cross-sectional view of the caplet mat and support member of FIG. 8.
Figure 11:
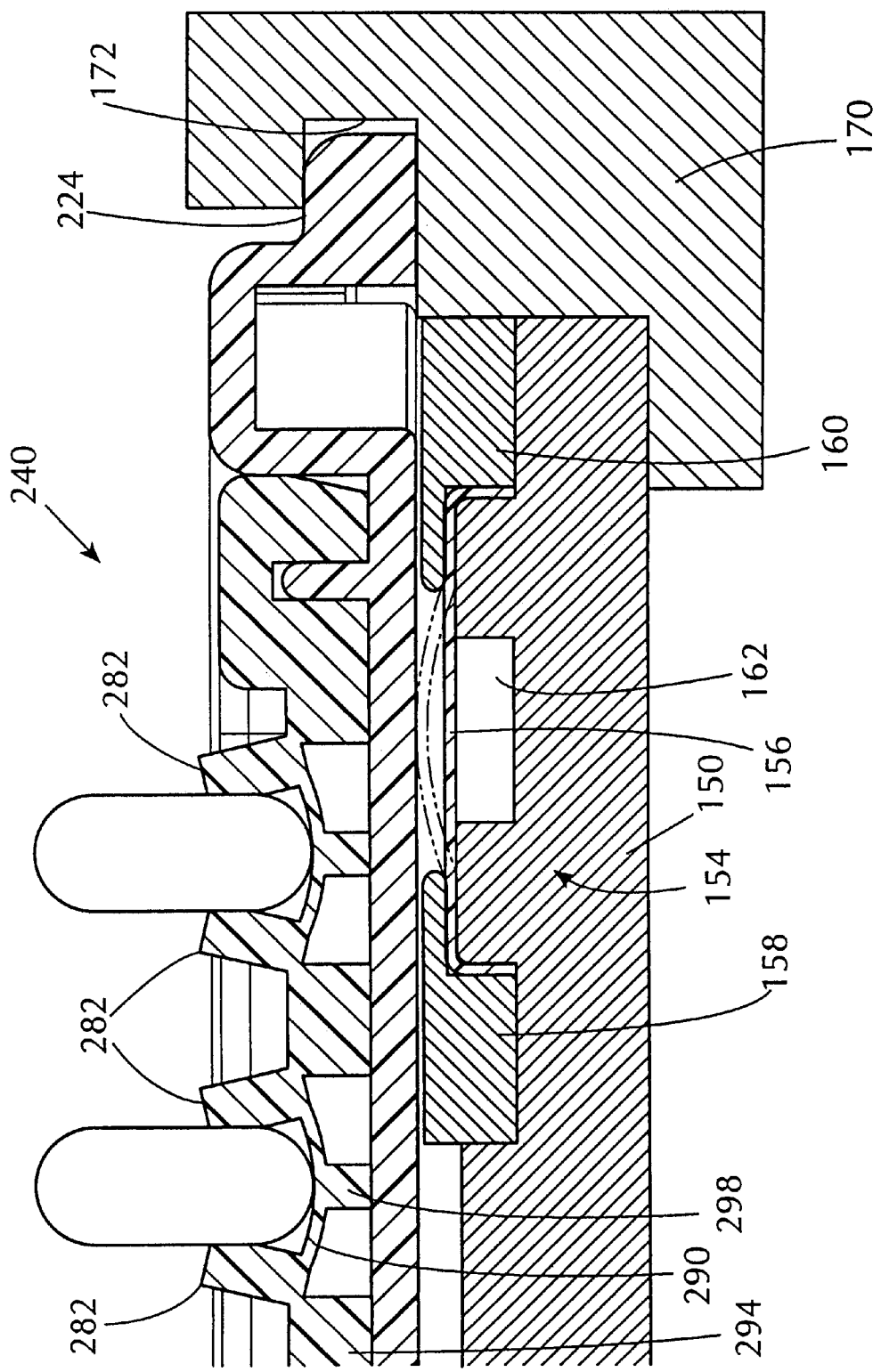
FIG. 11 is a partial cross-sectional view of the caplet mat and support member of FIG. 8 with a vacuum being applied by the end effector tooling in accordance with a preferred embodiment of the present invention.

Referring to FIGS. 10 and 11, each gripping portion 280 is integrally formed on a compliant diaphragm section 290 of the mat 270 which also forms the bottom section of the caplet-holding compartment 272. These compliant diaphragm portions 290 of the mat 270 are further arranged so that each compliant diaphragm portion 290 is aligned with at least one groove 218 in the receiving surface 214 of the support member 210.

The compliant diaphragm portion 290 of each caplet-holding compartment is maintained at a distance from the support member 210 by spacer ribs 294 integrally formed on the support member facing surface of the mat 270. Thus, as shown in FIG. 11, when suction is applied to the pallet assembly, the diaphragm 290 is drawn toward the support member 210 and the raised gripping portions 280 are deflected radially inward towards the caplet 206 contained within the caplet-holding compartment 272, thereby frictionally engaging (i.e., "gripping") the caplet 206. As a result, the array of caplets 206 in the pallet are straightened to have their longitudinal axes substantially all normal to the pallet receiving surface 214. This gives a uniform orientation and results in a reasonably consistent dipping from pallet to pallet.

In the preferred embodiment, the spacer ribs 294 run parallel to the gripping ribs 282 and are disposed between adjacent gripping rib pairs, although they are located on the opposite (i.e., support member facing) surface of the mat 270. In addition, the preferred embodiment includes stop ribs 298 also integrally formed on the support member facing surface of the mat 270, parallel to the spacer ribs 294 and centrally located below the caplet-holding compartments 272. These stop ribs 298 have a lower profile than the spacer ribs 294 and, therefore, do not contact the receiving surface 214 of the support member 210 when the diaphragm 290 is in its undeflected state as shown in FIG. 10. However, when a vacuum is applied and the diaphragm 290 is drawn toward the support member 210, as illustrated in FIG. 11, the stop rib 298 contacts the receiving surface 214 and prevents full deflection of the diaphragm 290.

It can be observed that the caplet holding compartments 272 of the illustrated embodiment, like the tablet receptacles 230, are arranged in a plurality of rows 271. Further, as in the case of the tablet receptacle rows 231, the caplet compartment rows 271 are each spaced approximately 0.743" center-to-center from the adjacent rows 271. This permits the same dryer section configuration to be used for both caplets and tablets without modification of the dryer air plenum plates 42 (described below). However, because the drop tube receiving compartments 274 are located between adjacent caplet compartments 272, compartments 272 within a row 271 are spaced further apart than the tablet receptacles 230, for example, approximately 1.5" apart center-to-center for 500 mg caplets.

In the case of both the tablets and the caplets, a medicament is placed in each of the receptacles by using drop tubes (described below) which allow the medicaments to free-fall into the receptacles under the force of gravity. The dimensions of the receptacles are such that the caplets or tablets become fully seated in a reasonably centered position. After loading, a vacuum may be applied to the support member to secure the mat to the support member and to secure the medicaments to the mat, thus allowing the pallet to be inverted without the medicaments falling out of the receptacles.

The Loading Station

Empty pallets are initially located on the conveyer 100 at the area labeled 102 in FIG. 1 with the medicament receptacle rows (231 or 271) oriented transverse to the direction of travel. The pallets are then sent to loading station 10 which is illustrated in more detail in FIG. 12. The loading station 10 preferably includes a feed assembly 420 of the type designed for filling blister packaging with solid dosage forms. Such a feed system is available from Aylward Corp., New Bern, N.C. The feed assembly 420 is modified for loading the particular dimensions of medicaments in the desired orientation into the pallet mats utilizing an array of modified drop tubes. Because of differences in the geometry of the medicaments and their respective mats 240 and 270, the caplet drop tubes 300 differ in construction from the tablet drop tubes 350, but in both cases each drop tube is long enough to hold more than one medicament at a time.

Figure 13A:
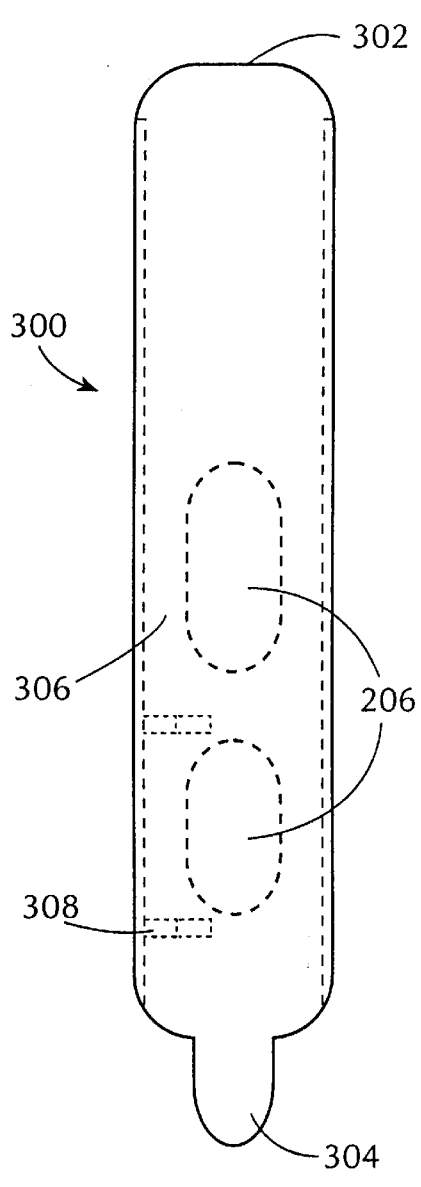
FIG. 13A is a front elevational view of the caplet drop tube of the present invention.
Figure 13B:
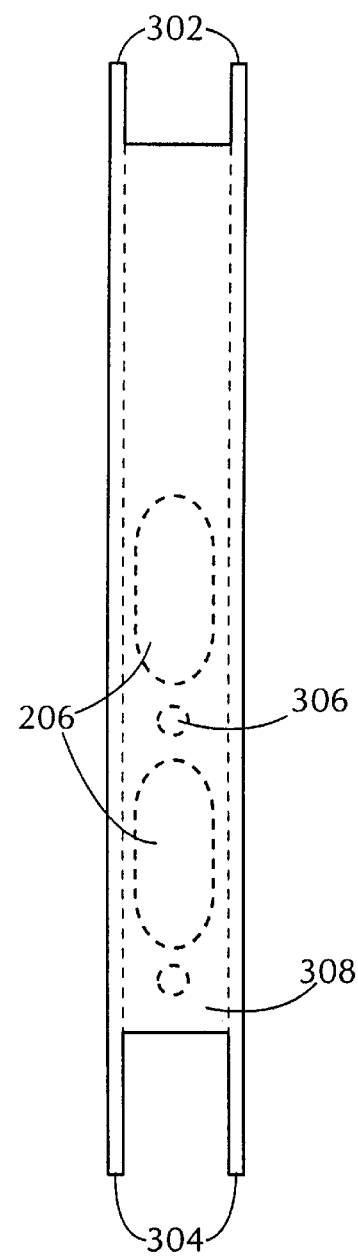
FIG. 13B is a side elevational view of the caplet drop tube of FIG. 13A.
Figure 13C:
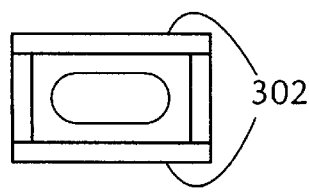
FIG. 13C is a top view of the caplet drop tube of FIG. 13A.

The caplet drop tube mechanism 300, shown in FIGS. 13A–13C, is a tube of appropriate dimensions to hold caplets 206 in a vertical orientation, i.e., with the longitudinal caplet axis in a vertical orientation. At the top of the caplet drop tube 300 are two guide flanges 302 mounted opposite each other. These guide flanges 302 help align the caplet 206 properly as it enters the top of the drop tube 300. A pair of holding pins 306 and 308 are located inside each caplet drop tube 300 near the bottom, one spaced vertically above the other, separated by a distance approximately equal to the length of a single caplet 206. These holding pins 306 and 308 act in tandem to hold the caplets 206 in place, and to release them one at a time into a pallet receptacle.

In operation, a pallet is first indexed under the array of drop tubes 300 and a lifting device raises the pallet such that it engages the bottom of the drop tubes 300 to deposit one medicament in each receptacle, one medicament per drop tube 300 at a time. In a preferred embodiment, the lifting device is located below the conveyor and consists of a plate with four locating pins in each corner. (Two pins are located on each side of the conveyer). Bolted to the plate with the pins are two Parker slide mechanisms so as to achieve motion in two dimensions (left to right and up and down). As a pallet to be filled approaches the load station, a pallet stop located below the conveyor is triggered. From below the conveyor, the pins are raised and guided into the holes at each corner of the pallet. Upward motion continues, lifting the pallet off of the conveyor until the pallet makes contact with the bottom of the drop tubes 300.

Figure 14A:
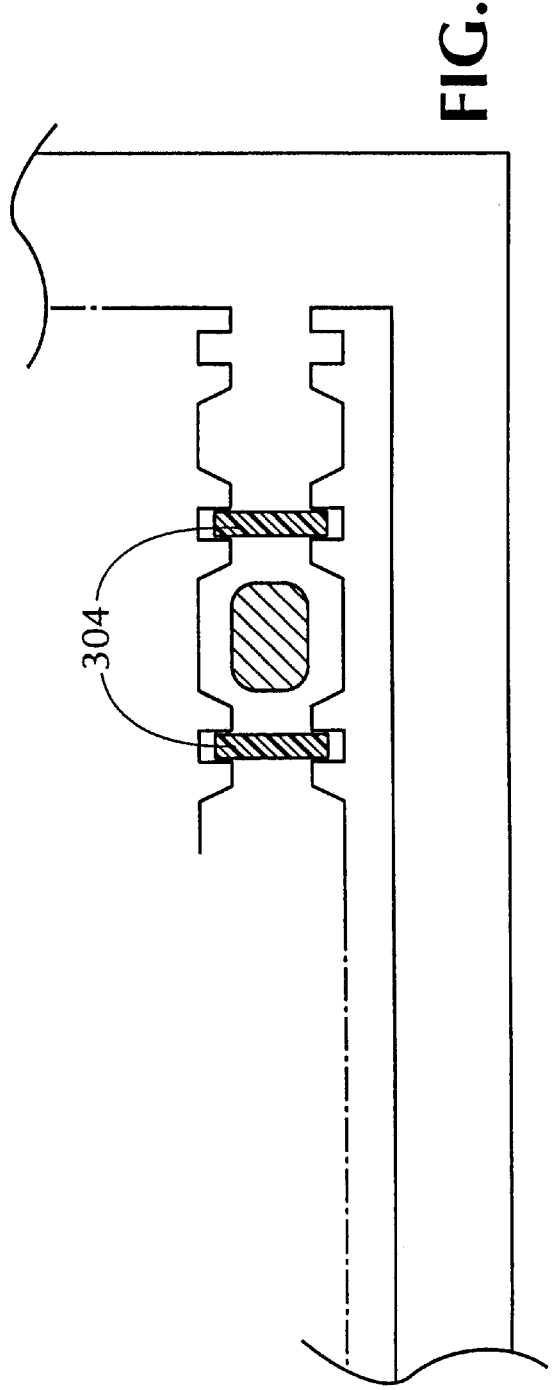
FIG. 14A is a partial cross-sectional top view of a caplet being loaded into a caplet mat by a caplet drop tube of the present invention.
Figure 14B:
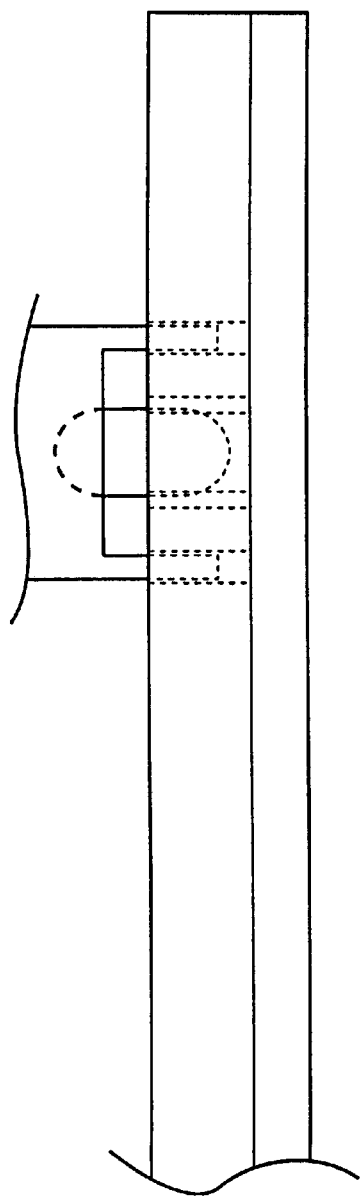
FIG. 14B is an elevational view of a caplet being loaded into a caplet mat by a caplet drop tube of the present invention.

In a preferred embodiment, the bottom of each caplet drop tube 300 is shaped with chamfered portions 304. The chamfered portions 304 contact the gripping ribs 282 of the caplet mat 270 at the drop tube receiving compartments 274. The chamfered portions 304 cause gripping ribs 282 (and consequently the caplet-holding compartments 272) to spread open slightly. (See FIGS. 14A–14B). This provides for a larger target for the caplet 206 to enter fully into the empty caplet-holding compartment 272 in a desirable position and orientation. When the pallet is lowered, the caplet 206 is left behind in the receptacle 272.

Figure 12:
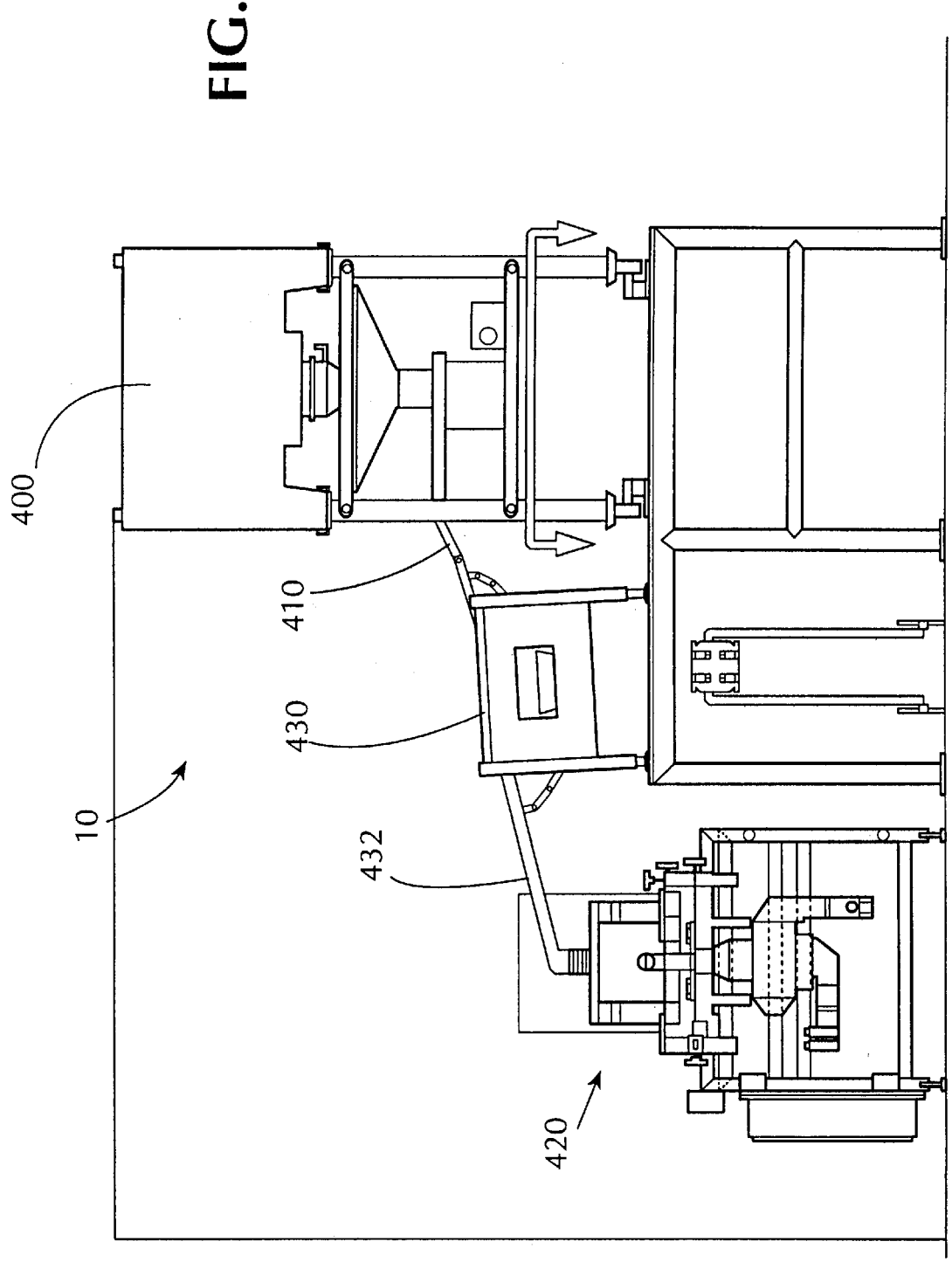
FIG. 12 is a side elevational view of the loading station of the present invention.

Referring to FIG. 12, caplets 206 initially located in a supply hopper 400 are controllably released and allowed to slide down a supply slide 410 onto a commercial sorter assembly 430, which sorts out partial or damaged caplets. One acceptable sorter 430 is the GMP model commercially available from the Ackley Corp. From the sorter 430, the whole, undamaged caplets 206 are sent down a second slide 432 to the feed assembly 420, described above.

In the feed assembly 420, the guide flanges 302 located at the top ends of the drop tubes 300 protrude through openings in a holding tray. The holding tray includes a number of hills and valleys and is designed to reciprocate (oscillate) up and down. This action causes the caplets 206 in the holding tray to move about the holding tray and eventually fall into the drop tubes 300 with the correct orientation. Accordingly, it is important that the caplets 206 in the holding tray be sufficient in number to fill all of the drop tubes 300, but not so great in number to impede the motion of the caplets 206 in the tray to permit the caplets 206 to fall into all of the drop tubes 300. The caplets 206 that fall into the drop tubes 300 are then held in place by the holding pins 306 and 308.

Each drop tube 300 feeds the caplets 206 one at a time by first retracting the upper holding pin 306, thereby allowing a caplet 206 to fall towards the lower holding pin 308, which is in its extended position. The upper holding pin 306 is then extended to block the next caplet 206 in the drop tube 300 and the lower holding pin 308 is retracted, thereby allowing the first caplet 206 to free-fall out of the tube 300 and into a caplet-holding compartment 272 of the pallet below. As noted, one caplet 206 from each drop tube 300 is simultaneously released into the pallet.

The lifting device then lowers the pallet slightly, indexes to the next adjacent row, and repeats the above process. In the described embodiment, each pallet is loaded in two steps because the spacing between the drop tube center lines is farther apart than the spacing of the receptacles in the pallet.

Figure 15A:
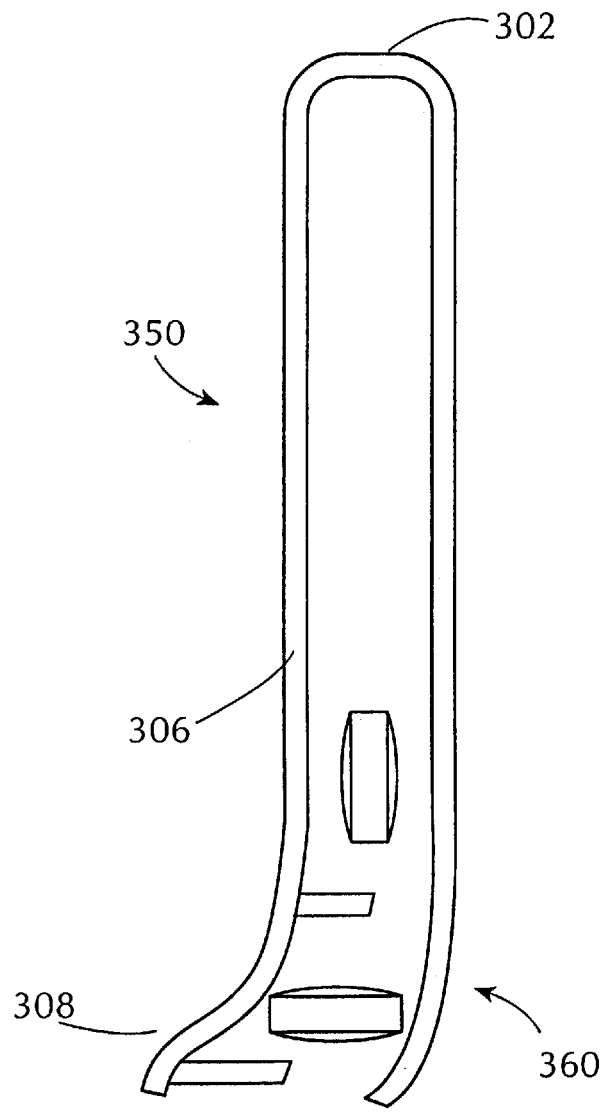
FIG. 15A is a front elevational view of the tablet drop tube of the present invention.
Figure 15B:
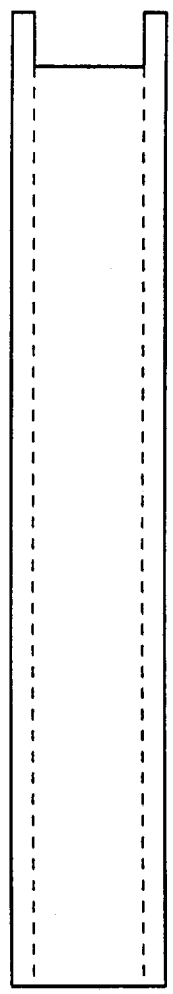
FIG. 15B is a side elevational view of the tablet drop tube of FIG. 15A.
Figure 15C:
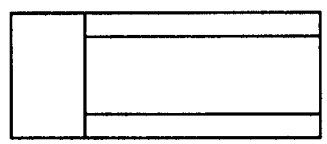
FIG. 15C is a top view of the tablet drop tube of FIG. 15A.

For the tablets, the modified drop tube 350 shown in FIGS. 15A–15C is used. The tablet drop tubes 350 are similar to the caplet drop tubes 300 but have been modified to include a J-shaped curved section 360 at the bottom of each tube 350. The J-shaped curve provides that as the tablets 204 slide down the tablet drop tubes 350, they rotate 90° from a vertical orientation (i.e., sidewall vertically oriented) to a horizontal orientation (i.e., sidewall horizontally oriented). The tablet drop tubes 350 are further modified in that the lower holding pin 308 has been moved from a position in the tube above the J-shaped curve 360, as in the prior art, to a place that is below the J-shaped curve 360 as illustrated in FIG. 15A.

In operation, the tablet pallets are loaded in a similar manner as the caplet pallets. Indeed, the same loading station, except for the drop tubes, may be used. With reference to FIG. 12, tablets 204 initially located in a supply hopper 400 are controllably released down slide 410 to sorter 430, which sorts out damaged and partial tablets 204. From sorter 430, the whole, undamaged tablets 204 are fed to the feed assembly 420 by way of slide 432. As with the caplet drop tubes 300, guide flanges 302 located at the top ends of the tablet drop tubes 350 protrude through openings in the holding tray of the feed assembly as the holding tray reciprocates (oscillates) up and down. This causes the tablets 204 in the holding tray to fall into the drop tubes 350 with the correct orientation. These tablets 204 are then held in place in the drop tubes 350 by the holding pins 306 and 308. One tablet 204 from each drop tube 350 is then simultaneously released into a pallet which as been indexed under the drop tubes 350 and raised by the lifting device to engage the bottom of the drop tubes 350.

The tablet loading process differs from the caplet loading process in that there are no chamfered portions on the tablet drop tubes 350 to act on the tablet mat 240. In addition, as described above, the tablet drop tubes 350 include a J-shaped curved section 360 at the bottom of each tube 350 so that as the tablets 204 slide down the tablet drop tubes 350, they rotate 90° from a vertical orientation to a horizontal orientation. However, as in the case of the caplet loading procedure, tablets 204 are loaded into a pallet in two steps, due to fact that the spacing between the drop tube center lines is farther apart than the spacing of the receptacles in the tablet mat 240. It should be understood that the dimensions of the medicament and the loading station drop tubes will determine whether more or less than two loading steps are needed to fill a pallet.

The First Dipping Station

Figure 16:
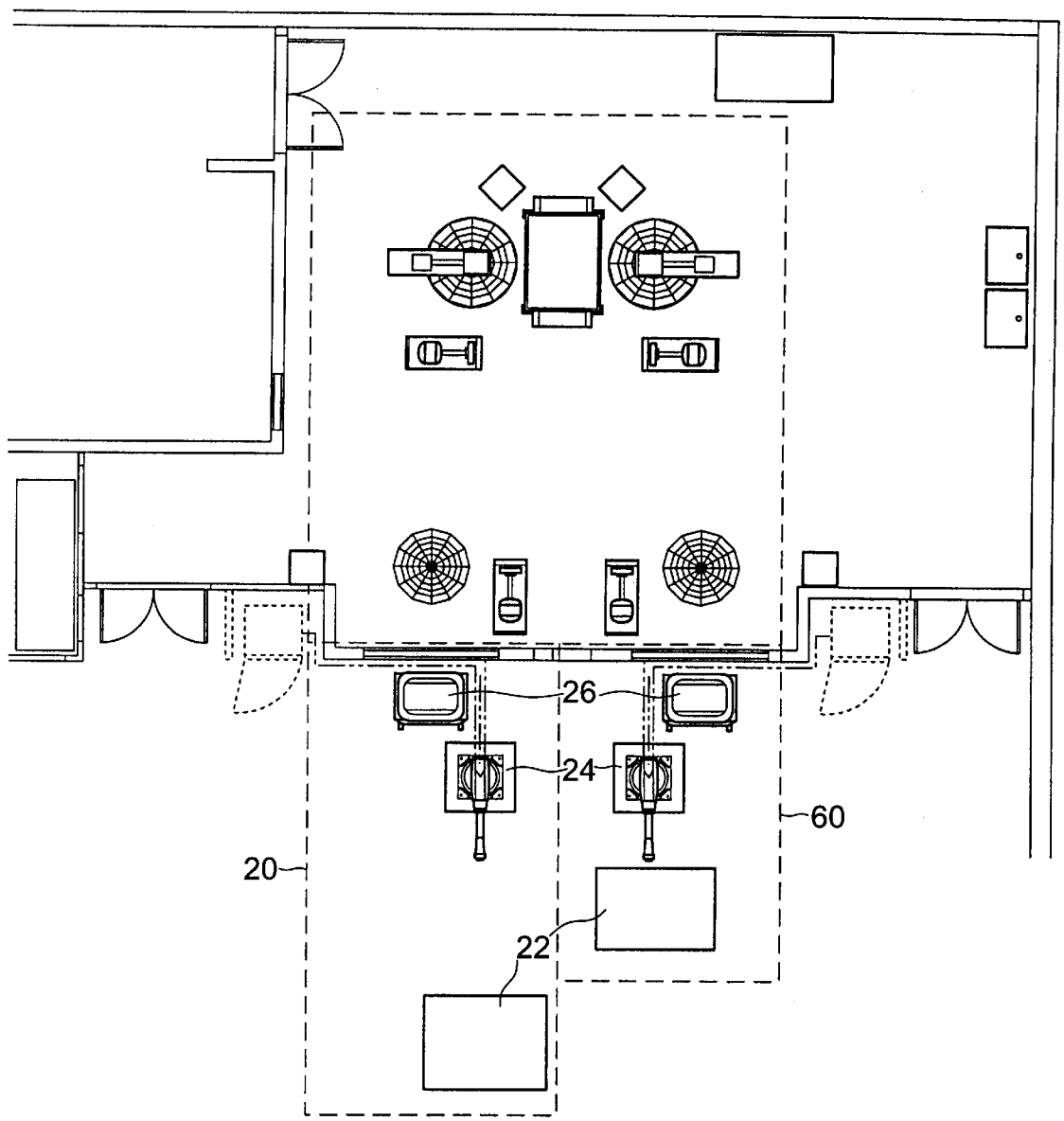
FIG. 16 is a top view of the dipping stations and automatic drawdown system of the present invention.
Figure 17:
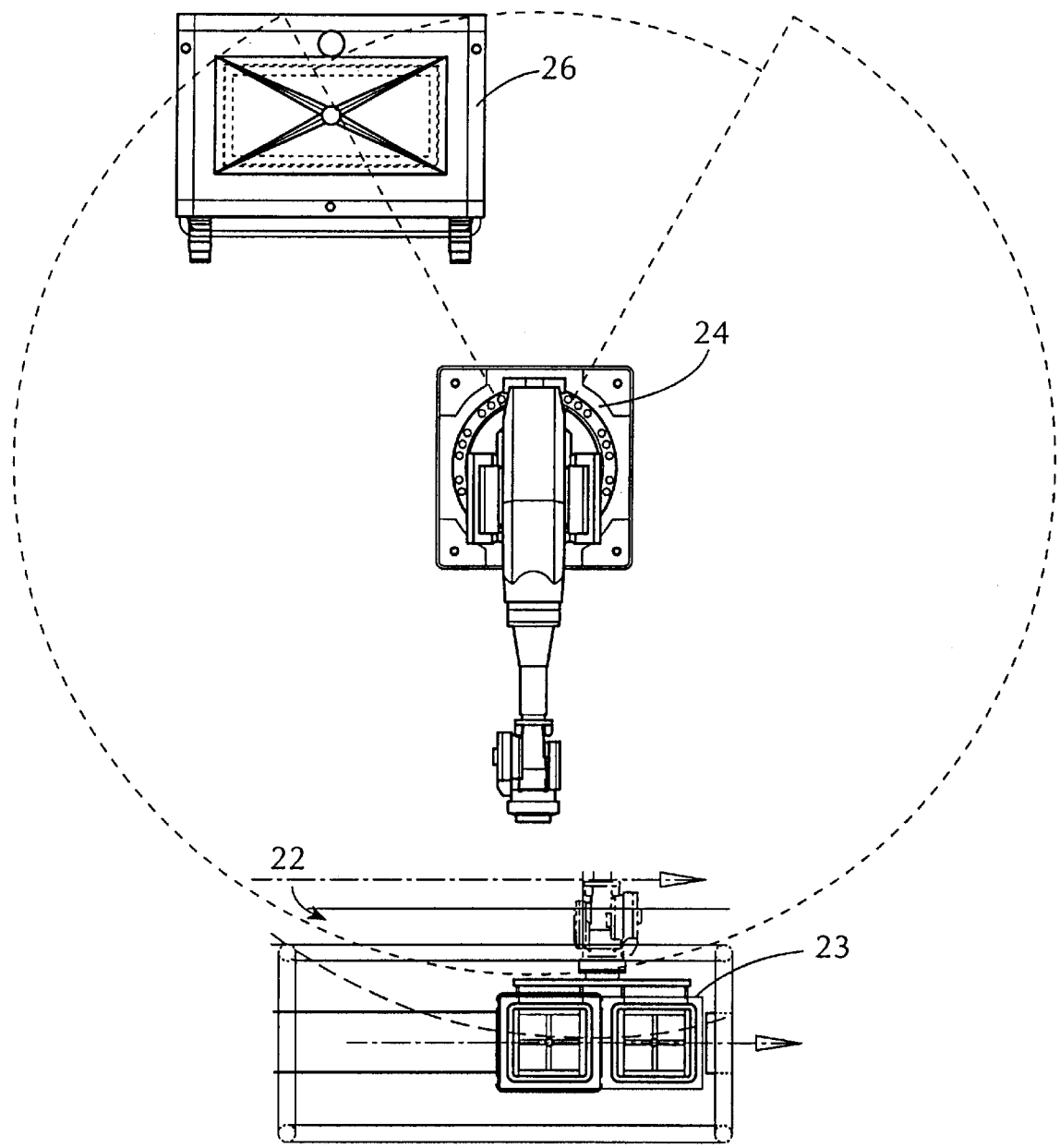
FIG. 17 is a top view of one of a dipping station of the present invention.

After a pallet is loaded, it is carried along by the conveyer 100 through section 104 in FIG. 1 to the first dipping station 20. As illustrated in FIGS. 16 and 17, each dipping station includes a pallet capture station 22, a commercial robot 24 and a dipping vat 26 full of the liquid coating material.

The robot system of the preferred embodiment is a Fanuc Model S-700 Robot. The robot system includes a System R-J Controller with TPP and KAREL software, the specifically designed end effector tooling 23, and the Model S-700 robot 24. The robot 24 is a series of mechanical links driven by servo motors, which working from the robot rotating base up through the end effector tooling 23, includes six axes of rotation. The software controls robot motion in all six axes as well as the input/output that may be used between the controller and any other devices. Control of the robot provides for accuracy of motion to within 0.001 degrees or 0.023 millimeters in terms of increments of motion at higher end motion speeds. Maximum speed of movement as measured at end effector tooling is approximately 700 in./min.

Each capture station 22 includes an actuator mechanism for capturing pallets and loading two pallets at a time onto the end effector tooling 23 of the robot 24. Appropriate pallet stops, pushing mechanisms, microswitches, linear actuators and the like are used to temporarily retain and precisely and positively load the two pallets into the correct position on the end effector tooling 23. In a preferred embodiment, a pneumatically controlled pallet stop stops pallets from entering into the capture station 22 until the previous dip cycle has been completed. The pallet stop is then released allowing two pallets to advance into the station. At the same time pallets are advancing, a slide mechanism located below the pallets is re-indexed and sets a slide finger in an upward position to then push the two pallets onto the end effector tooling 23. (This pushing of two pallets on also pushes two off the end effector tooling 23 at the same time).

Referring to FIGS. 7, 11, 18 and 19, the end effector tooling 23, which is specifically designed for the particular operation, is essentially a platform 150 having a pair of end rails 170 along its outer edges, parallel to the direction of pallet travel. Each end rail 170 includes a slot 172 adapted to receive a corresponding edge 224 of the pallet support member 210 (see FIGS. 7 and 11). Thus, when the end effector tooling 23 is positioned between the conveyor sections 104 and 106 in the capture station 22 with the top surface 152 of the platform 150 at approximately the same level as the conveyor surfaces, pallets may be indexed onto the tooling platform 150 where they are engaged by the slots 172 of the end rails 170.

Figure 19:
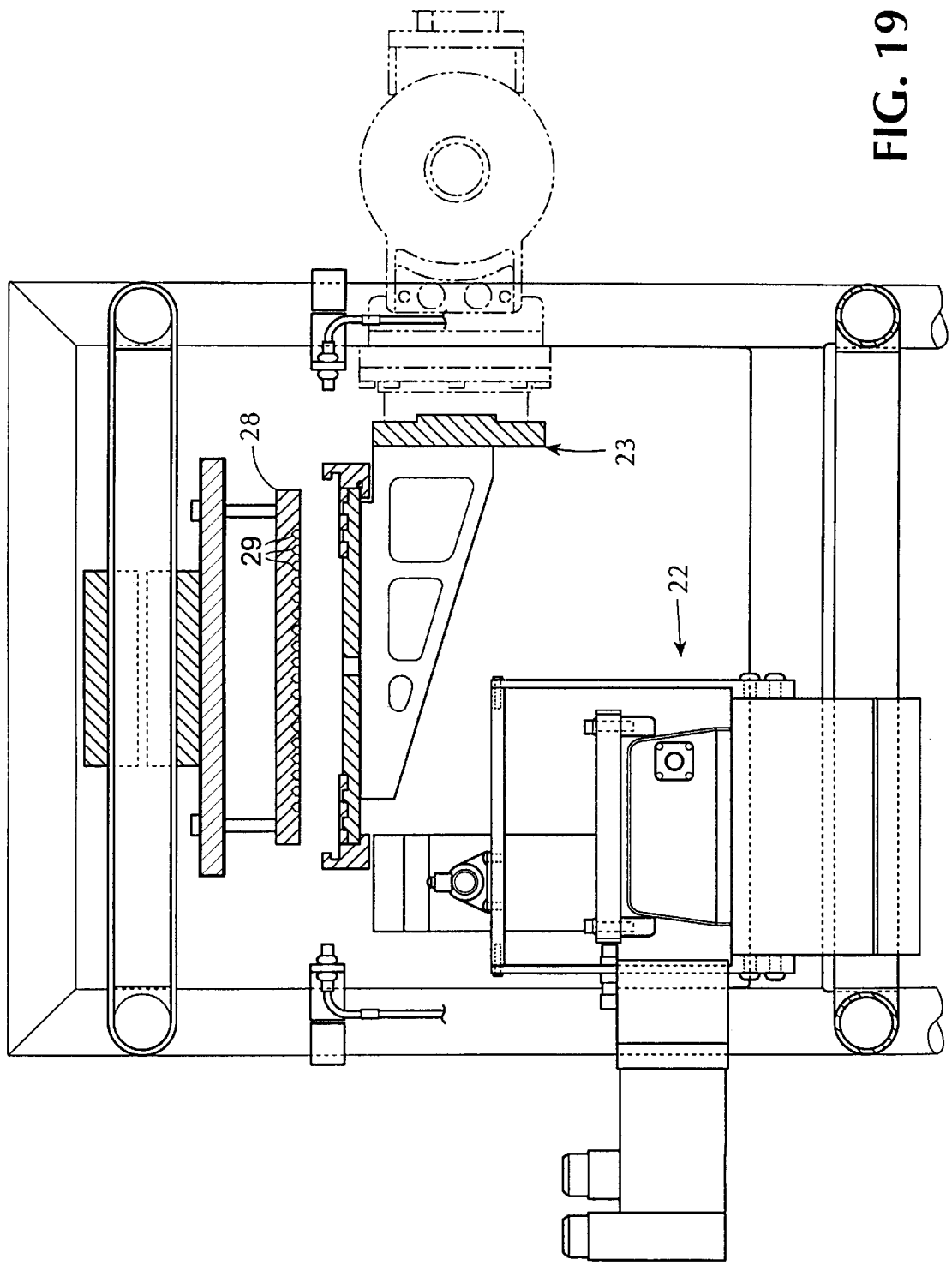
FIG. 19 is a cross-sectional view of the end effector tooling and centering plate used to center caplets at a dipping station of the present invention.

The platform 150 of the preferred embodiment also has a pair of square air bladders 154. Each air bladder 154 comprises a flat rubber liner 156, approximately ½ inch wide, forming a continuous square band. As best seen in FIGS. 7, 11 and 19, the rubber liners 156 are held in place by inner and outer frames 158, 160, between which are channels 162 in the platform 150 for communicating air pressure throughout the rubber liners 156. Each air bladder 154 is positioned on the platform 150 to align with the periphery of one of the pallets when properly indexed on the platform 150. Thus, after two pallets have been indexed onto the platform 150, the air bladders 154 are pressurized to inflate slightly and push on the underside of the corresponding pallets at a smooth region 226 which forms a continuous square ring inboard of the periphery of the pallets. The pallets are thereby frictionally secured to the end effector tooling 23 between the pressurized bladders 154 and the slots 172 in the side rails 170. (See, FIGS. 7 and 11). The air bladders 154 also function to form a positive seal with the pallets for the application of a vacuum, as described below.

The end effector tooling 23 also houses a pair of eductors 168 mounted to the underside of the platform 150. The eductors 168 take compressed air and convert that energy into a vacuum. One acceptable eductor 168 is commercially available from PIAB.

Figure 18:
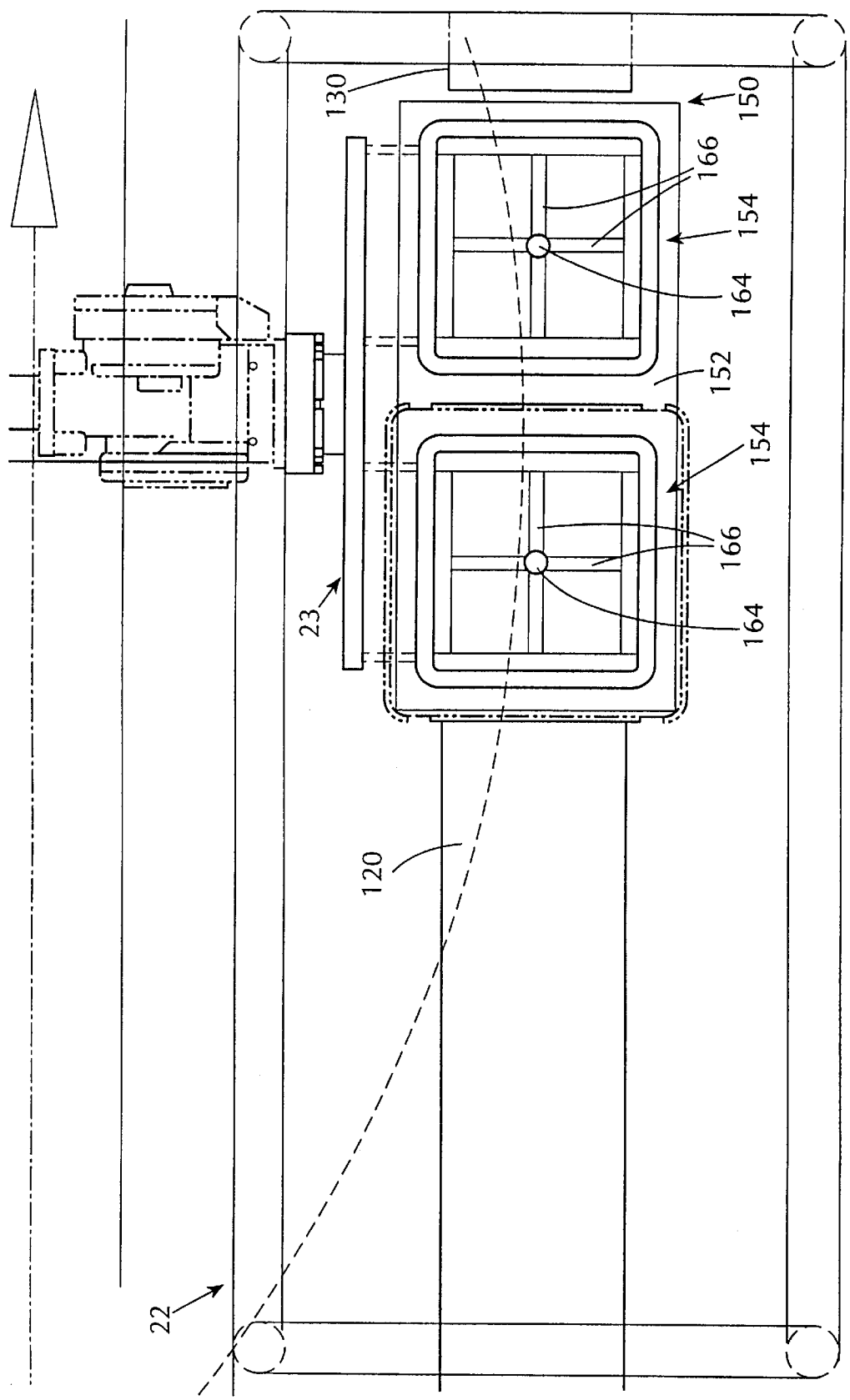
FIG. 18 is a top view of the capture station and end effector tooling of FIG. 17.

In operation, pallets are indexed onto the tooling platform 150 from conveyor section 104 two at a time by a servo driven slide tab. The air bladders 154 are then pressurized to secure the pallets to the tooling 23 and the eductors 168 are activated to apply a vacuum to the bottom of pallets. As best seen in FIG. 18, the vacuum is applied through apertures 164 located in the tooling platform 150. One vacuum aperture 164 is centrally located within each of the areas defined by the air bladders 154. In addition, two vacuum distribution channels 166 are formed in the platform 150 perpendicular to each other and intersect at the vacuum aperture 164. The vacuum is communicated through four holes in each pallet support member 210 to act on the rubber mat 240 or 270 positioned thereon to secure the medicaments to the pallet, as previously described. The robot 24 then extracts the pallets (with vacuum on) from their position in the conveyor system 100 and moves them to the dipping vat 26.

Upon completion of the dip cycle (described below), the pallets are returned to the capture station 22 by the robot arm 24. The vacuum is then deactivated and the air bladders 154 are depressurized. The just-dipped pallets are then urged off of the tooling platform 150 and onto the next conveyor section 106. The next two pallets, which have been queued up, may then be indexed into the tooling platform and the process repeated. The robot does not control the end effector tooling 23 except for positioning. The actuation of the vacuum on/off, and setting conditions under which the robot can start and stop its cycle, is controlled by the main programmable logic controller of the carrier handling system (described below).

When coating caplets, each capture station 22 optionally may include a centering plate 28 having a series of countersunk holes 29. This plate 28 may be used to center and orient axially the caplets to ±5° vertical. FIG. 19 illustrates how the centering is obtained by using the robot arm end effector tooling 23 to engage the two pallets and raise the pallets vertically against the centering plate 28 so that the caplets engage the corresponding holes 29. The pallets are urged against the centering plate 28 with a vacuum being applied so as to hold the caplets in a properly oriented position. When coating tablets, this step is generally not necessary. It also may be omitted for caplets depending on the size of the caplets and the dimensions of the receptacles. Further, the centering plate 28 could alternatively be lowered onto the pallets and then raised after the centering operation.

Figure 20:
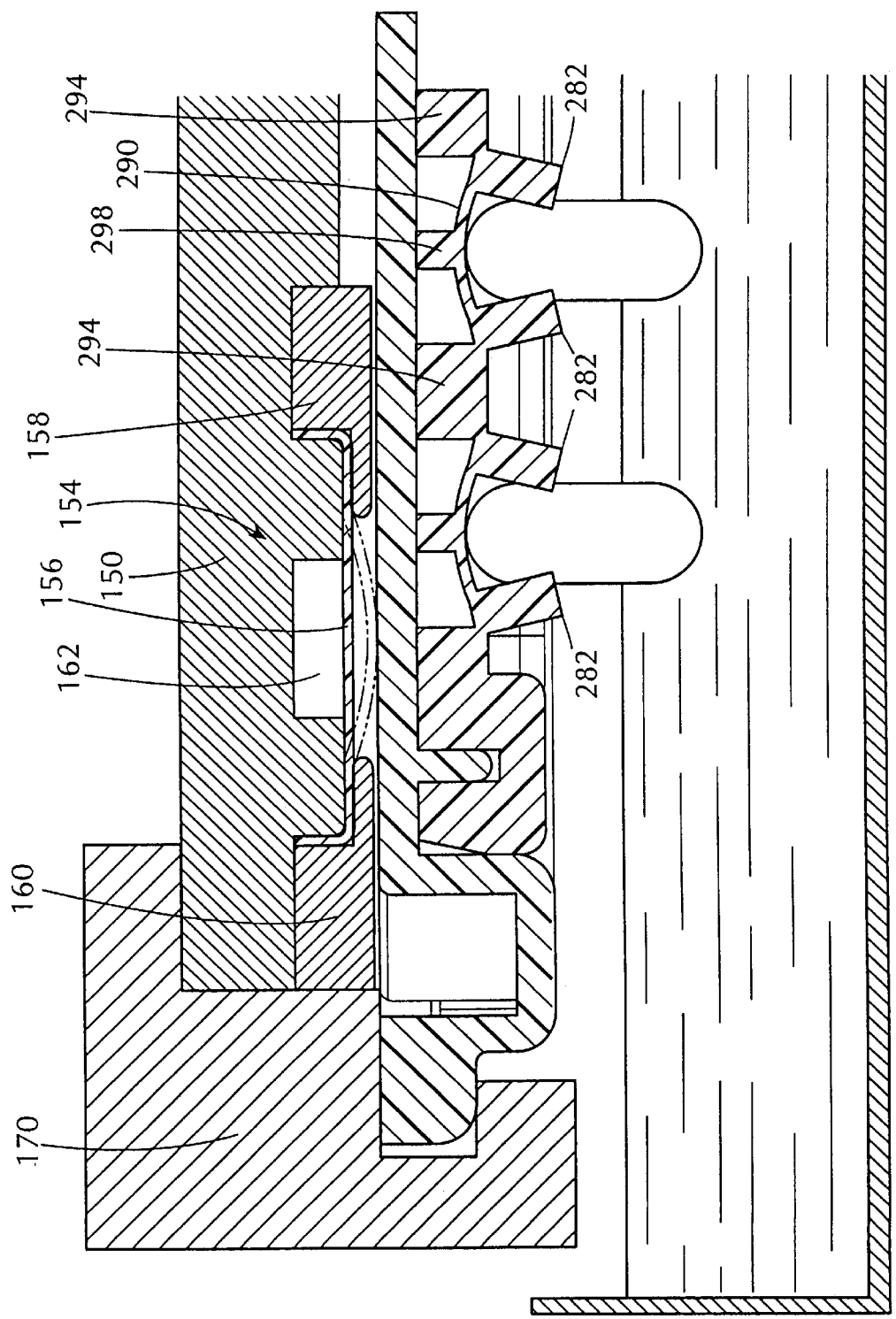
FIG. 20 is an cross-sectional view of caplets being dipped at a dipping station of the present invention.
Figure 21:
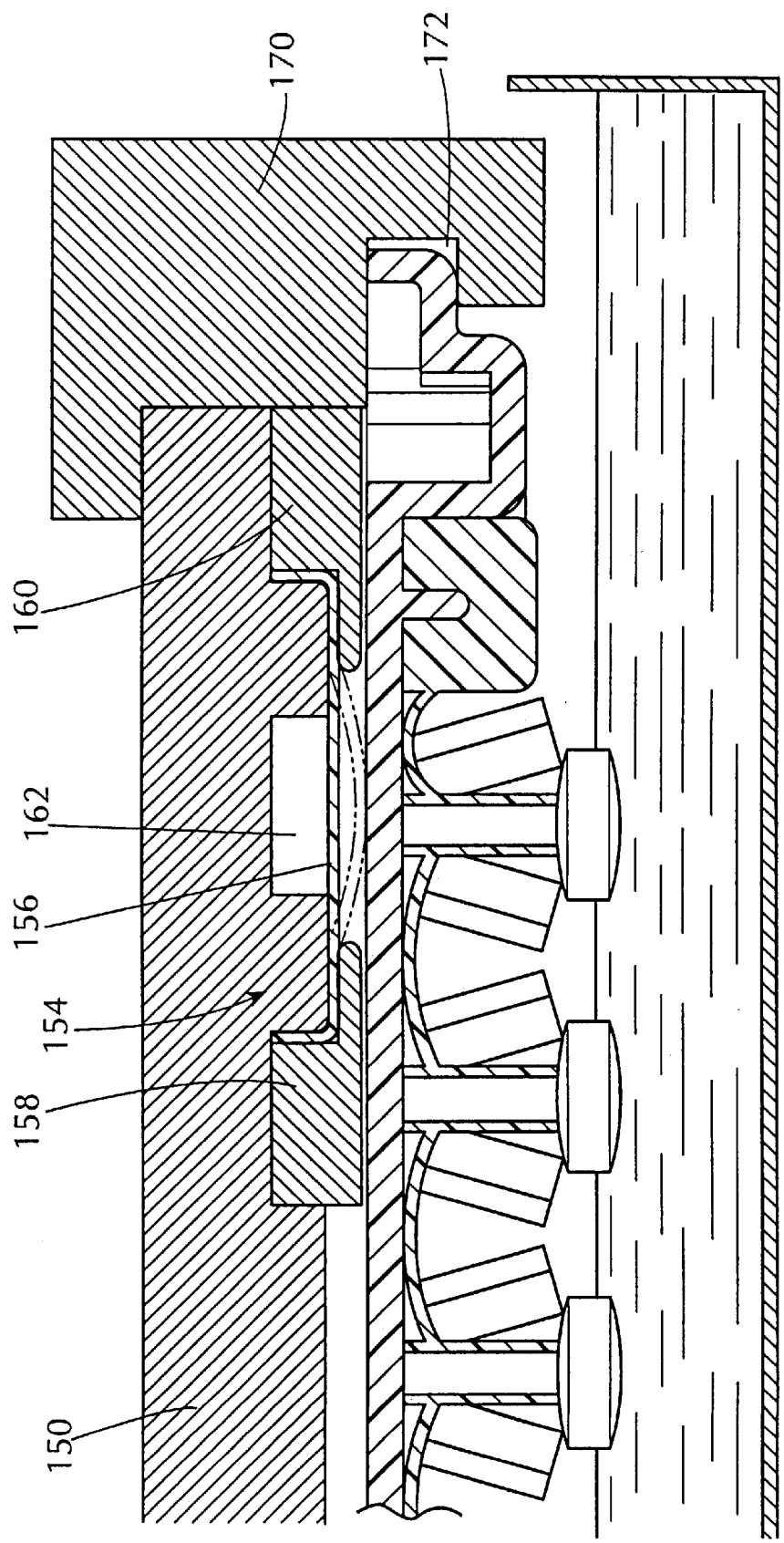
FIG. 21 is an cross-sectional view of tablets being dipped at a dipping station of the present invention.

The dipping vat 26 contains the first coating which in the preferred embodiment is a white gelatin coating. The robot 24, after withdrawing two pallets from the pallet capture station 22, and, in the case of caplets, optionally centering them using the centering plate 28, inverts the pallets with the vacuum engaged and dips the medicaments into the gelatin bath, using precisely controlled times and rates for lowering, holding and raising the medicaments. FIGS. 20 and 21 show caplets and tablets, respectively, being dipped by the currently preferred embodiment. As illustrated, the medicaments are dipped into the gelatinous bath to coat slightly more than half the medicament.

The speed with which the medicaments are lowered and raised from the gelatin, the amount of time the medicaments are held in the gelatin, and the gelatin temperature and viscosity, are particularly important to ensure that the medicament is covered by the gelatin to the desired degree and with the desired coating thickness, and migration is kept to a minimum when the pallet is returned to an upright orientation. The currently preferred gelatin (described below) is maintained at a temperature range of 120–130° F. and has a viscosity of from 400 to 625 centipoise. It has been found that the parameters listed in Table 2 yield the most desirable results for a gel temperature of 124° F. for yellow and white and 127° F. for red, and viscosity of 400–600 centipoise.

Table 3 contains the presently preferred parameters for the first dipping station 20, as well as the second dipping station 60 (described below).

TABLE 2

DIPPING PROFILE RANGES

| MOVEMENT VARIABLE | RANGE OF VALUES |
| --- | --- |
| Approach Rate (in/min) | 550–650 |
| Approach Dwell (sec) | 0.0–2.0 |
| Dip Rate (in/min) | 30–45 |
| Dip Dwell (sec) | 0.0–4.0 |
| Withdrawal Rate (in/min) | 4.5–7.5 |
| Withdrawal Dwell (sec) | 0.0–1.5 |
| Departure Rate (in/min) | 550–650 |
| Depart Dwell (sec) | 0.0–3.0 |

TABLE 3

PREFERRED DIPPING PROFILES

| MOVEMENT VARIABLE | FIRST DIPPING STATION 325 mg CAPLET (WHITE) | SECOND DIPPING STATION 325 mg CAPLET (YELLOW) | FIRST DIPPING STATION 500 mg CAPLET (WHITE) | SECOND DIPPING STATION 500 mg CAPLET (RED) |
| --- | --- | --- | --- | --- |
| Approach Rate (in/min) | 600 | 600 | 600 | 600 |
| Approach Dwell (sec) | 0.0 | 0.0 | 0.0 | 0.0 |
| Dip Rate (in/min) | 40.0 | 35.0 | 40.0 | 40.0 |
| Dip Dwell (sec) | 1.0 | 1.0 | 1.0 | 1.0 |
| Withdrawal Rate (in/min) | 6.0 | 6.0 | 6.9 | 5.5 |
| Withdrawal Dwell (sec) | 0.5 | 0.5 | 0.3 | 2.0 |
| Departure Rate (in/min) | 600 | 600 | 600 | 600 |
| Depart Dwell (sec) | 0.0 | 0.0 | 0.0 | 0.0 |
| Invert Dwell (sec) | 1.0 | 1.0 | 1.0 | 1.0 |
| Slide accel/decel (in/sec$^2$) | 80 | 100 | 150 | 150 |
| Slide Speed (in/min) | 55 | 65 | 85 | 85 |
| Slide Initiation (sec) | 2 | 2 | 2 | 2 |

Referring to Tables 2 and 3, once the medicaments have been positioned over the dipping vat in an inverted orientation, they are lowered towards the gelatin coating by the robot arm 24 at the indicated "Approach Rate" until they are just above (i.e., about 1/8 inch above) the fluid level in the dipping vat 26 where they remain for the indicated "Approach Dwell" time. The medicaments are then lowered at the prescribed "Dipping Rate" into the gelatin coating until they reach the desired dip depth and allowed to remain partially submerged for the indicated "Dip Dwell" time. The medicaments are then raised from the gelatin coating at the listed "Withdrawal Rate" to a point where the end of the medicament has just passed the fluid surface, i.e., 0.005"–0.010" above the fluid level, and held in place above the gelatin bath for the "Withdrawal Dwell" time. The medicaments are next raised further from just above the gelatin bath, at the indicated "Departure Rate", to the initial position, where they remain at rest for the "Departure Dwell" time before being inverted to their upright orientation. After being returned to their upright orientation, the medicaments remain in position above the dipping vat 26 for "Invert Dwell" time and are then returned to the capture station 22 by the robot arm 24.

The "Slide accel/decel" rates listed in Table 3 are the acceleration and deceleration rates of the slide which pushes the pallets onto the end effector tooling 23 of the robot arm 24. Similarly, "Slide Speed" is the speed of the pallet indexing slide at the end of the acceleration cycle. If either of these values is improperly set, the medicaments could be dislodged from the pallets when being indexed onto or removed from the end effector tooling 23. The "Slide Initiation" is the time required before the slide motion can be initiated. This time is required, for example, to clear the pallets on the end effector tooling 23 before a subsequent pair of pallets can be loaded onto the tooling 23.

These parameters provide for a rapid chill set of the gelatin coating with minimal runback as the medicaments are extracted from the bath and inverted 180° to the coated side up position. They advantageously avoid the need for dabbing the medicaments to remove excess gelatin at the bottom of the medicaments, and for additional angular movement, e.g., 360° rotation about the longitudinal axis or the plane of the pallet, thereby reducing the processing steps required.

At the conclusion of the first dipping sequence, the robot 24 restores the two pallets to the upright orientation and returns them to the capture station 22, where the vacuum is turned off and the air bladders 154 are depressurized. The capture station 22 then operates a microswitch and uses a pushing mechanism (e.g., a pusher tab mounted on a servo driven slide) to release and push controllably the next two pallets, which may have been backed up on the conveyor, into the capture station 22, thereby ejecting the two just-dipped pallets out of capture. station 22 and onto the following conveyor section 106. Thus, the next two pallets are loaded into the capture station 22 of the dipping station 20.

The Dryer Station

The just-dipped pallets advance along the conveyor 100 through section 106 in FIG. 1 into the dryer loading area designated at 32. The pallets are then transferred in groups of four onto a dryer conveyor 100a that advances the pallets four abreast through the dryer station 30. The dryer station 30 includes two drying rooms 34 and 36 separated by a wall, with each room having two parallel 40 foot long dryer conveyors running through it, one conveyor for first pass drying and the second for second pass drying (described below). Thus, on each pass the medicaments travel through 80 feet in total.

As the pallets are advanced through the dryer station 30, they pass under air plenum plates 42, each of which has a plurality of apertures 44 through which a downward air flow is directed. The plates are 1/8 inch thick and are disposed approximately 1 to 1½ inches above the medicaments. Each aperture 44 is 3/32 inch in diameter with a 1/16 inch countersink on the air supply side. Using the process air handling system described below, this results in a jet velocity through each aperture 44 of approximately 8,000 feet per minute.

Figure 22:
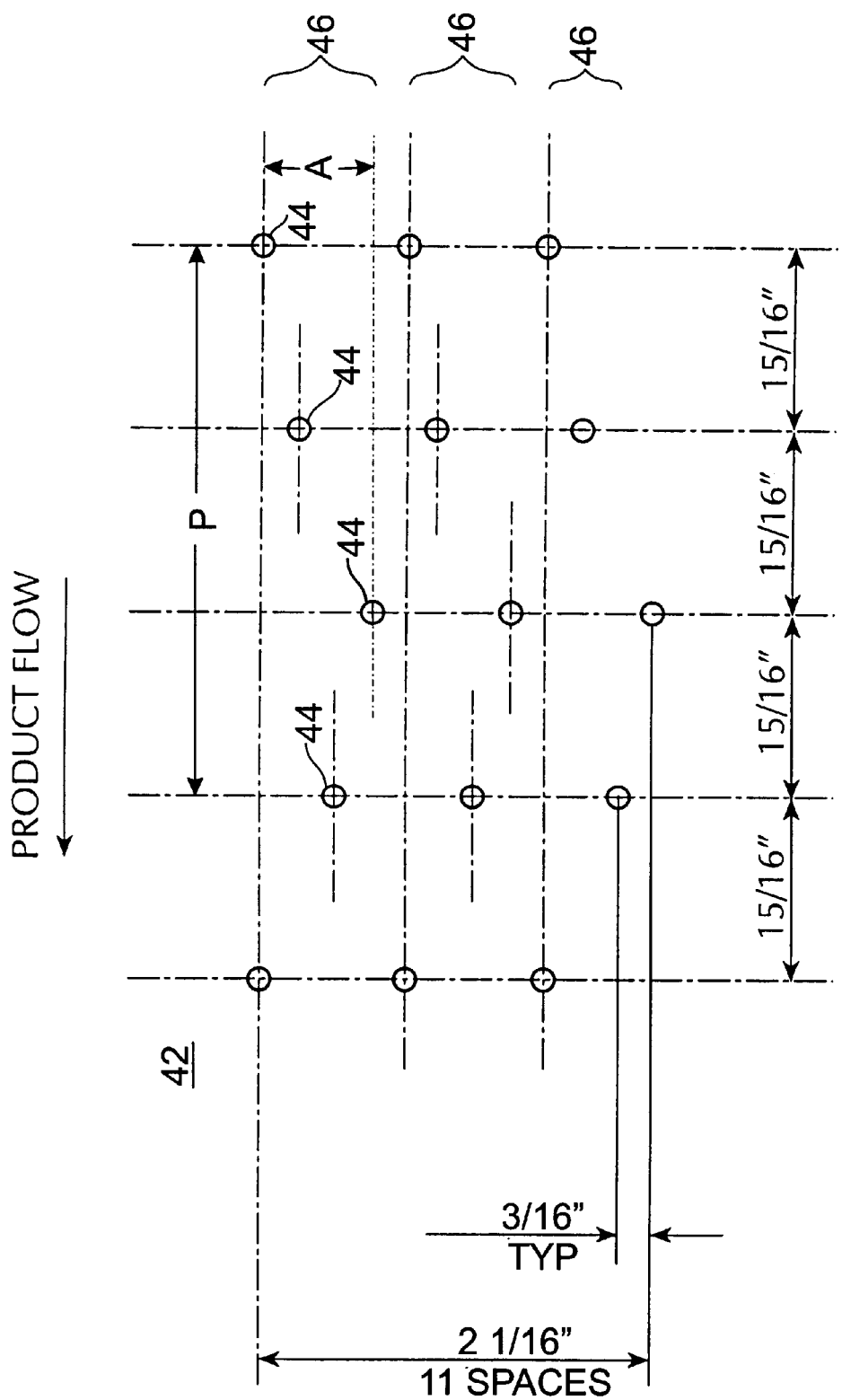
FIG. 22 is a partial top view of a dryer air plenum plate of the present invention.

In the currently preferred embodiment, the air flow apertures 44 in the plates 42 are arranged in a plurality of sinusoidal rows 46, each running in the direction of product flow. FIG. 22 is a partial top view of an air plenum plate 42 illustrating the arrangement of air flow apertures 44. The apertures are longitudinally spaced at intervals approximately $15/16$ of an inch from each other in the direction of product flow. Apertures in adjacent rows are laterally spaced approximately $3/4$ of an inch apart. To form a sinusoidal-like arrangement, the holes in each row are offset laterally from a common line by varying distances. Looking at FIG. 22 from left to right, the holes in each row are offset by 0, $6/16$, $9/16$ and $3/16$ inches, (for an amplitude A of $9/16$ inches) which pattern repeats itself every $3\,3/4$ inches (for a period P of $3\,3/4$ inches).

In the currently preferred embodiment, it is desirable to provide approximately one sinusoidal row 46 of apertures 44 for each row (231 or 271) of medicaments on the pallets as they pass below. Since the spacing between adjacent caplet compartment rows 271 and between adjacent tablet receptacle rows 231 is approximately equal to each other and to the spacing of the sinusoidal air aperture rows 46, this is accomplished by passing the pallets through the dryer sections with the medicament rows (231 or 271) oriented in the same direction as the product flow. As a result of the high air velocity and sinusoidal aperture arrangement, each medicament passes through numerous high speed air swirls as it travels linearly through the dryer tunnel. This results in quick uniform drying of the entire coated medicament surface.

Figure 23:
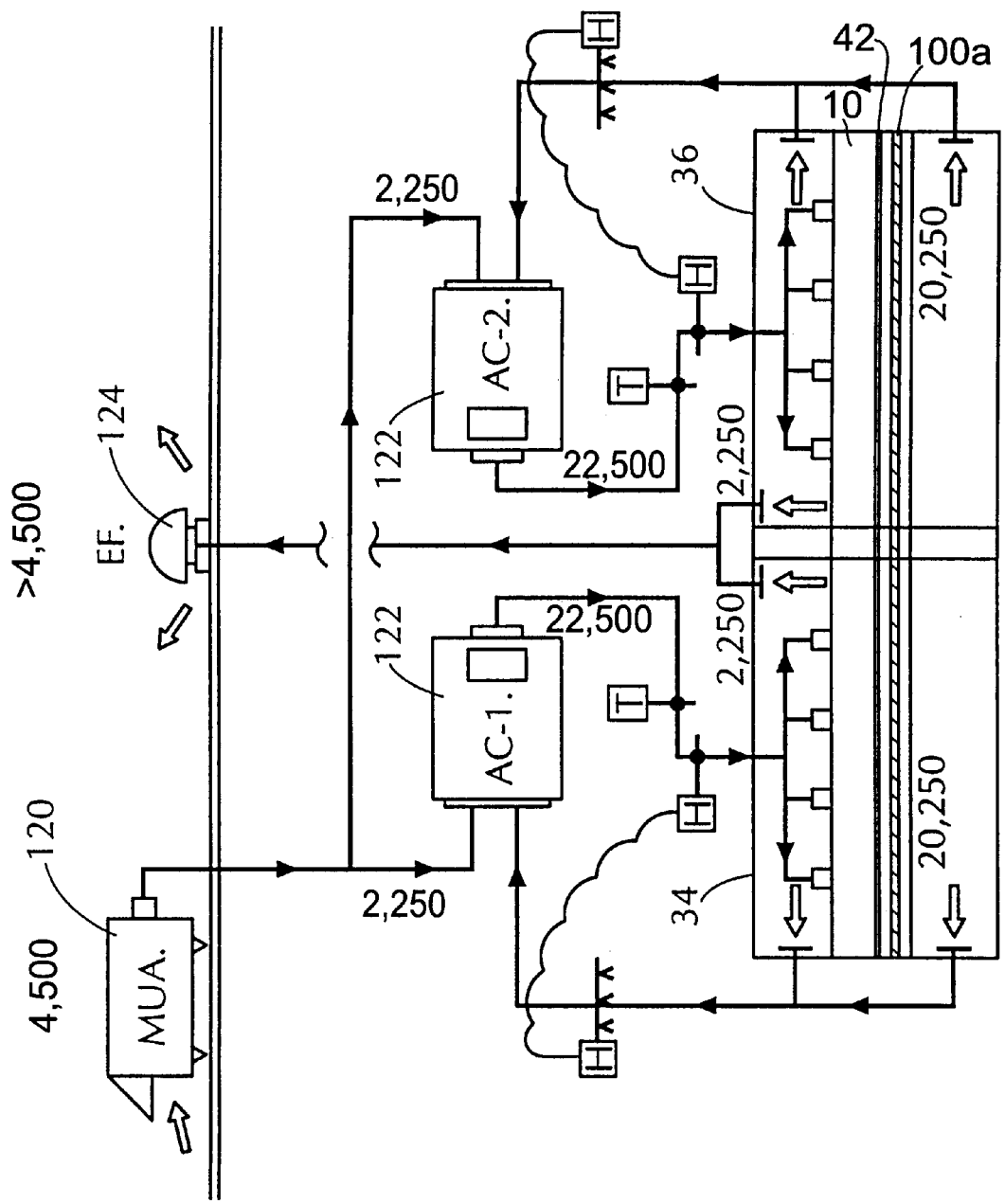
FIG. 23 is a schematic diagram of the process air flow handling system of the present invention.

The first and second dryer rooms operate at essentially the same conditions which are 34° C. dry bulb 18° C. dewpoint, nominal, with the total airflow from the air plenums being sufficient to generate a five inch static pressure (approximately 22,500 cubic feet per minute in each room). By contrast, the ambient temperature and humidity of the room in which the CHS is located is typically maintained at 72±5° F. and 50±5% relative humidity. The moisture driven off of the medicaments is exhausted by a process air exhaust system. FIG. 23 is a schematic diagram of the presently preferred process air flow handling system.

Approximately 10% (4,500 cubic feet per minute) of the total process air requirement is drawn from outside (or inside) of the building by a make-up air handling unit 120. This air passes through a commercially available air handler that features a pre-filter and filter section, and heating and cooling coils. Air is then drawn into a commercially available fan and the fan's discharge is equally split to deliver the pre-conditioned air (constant drybulb and dewpoint temperatures) to two process air handling units 122. This is a once through system.

Supply air from the make-up air handler 120 and return air from the drying room is mixed and drawn into the suction side of a commercially available unitary air handling units (process air handling units) 122. In the process air handler 122, air passes through a pre-filter and filter section for removal of gross particulate. Air then passes through heating and cooling coils to temper the air to the desired dry bulb temperature for drying the product. Air is then drawn into a commercially available fan that has a discharge capacity of 22,500 cubic feet per minute.

After the fan, moisture is introduced into the air stream to provide the desired dewpoint delivered to the product. The dry bulb and dewpoint conditioned air then travels through the delivery ductwork to then feed the air delivery plenums 40 directly over the exposed product in the dryer rooms 34 and 36. Inside the plenums 40, air passes through final high efficiency particulate air (HEPA) filters for particulate removal then passes through the air plenum plates 42 which provide the impingement drying of the product. The static pressure of the system is measured between the HEPA filters and the plenum plates 42. After the drying, the air is then drawn back to the suction side of the process air handler to repeat the process.

Each of the two drying rooms are connected to an exhaust fan 124 that extracts air and drives off moisture from the space. The amount of air exhausted is dependent on the amount of air delivered by the make-up air handling unit 120. (Typically, the volume of air exhausted is greater than that supplied by the make-up air handling unit so as to keep the drying room under a negative pressure relative to the CHS area).

After passing through the two dryer rooms 34, 36 the pallets are advanced to the exit area, designated 38 in FIG. 1. At area 38, the four pallets are held against a stop, and then transferred onto the next conveyor section 108 in groups of four. The four pallets then advance to the reorientation station 50 where they are stopped, held and flipped one pallet at a time.

The pallets are advanced through the dryers at approximately 2.5 feet per minute. Thus, it takes approximately 32 minutes to pass through both 40 foot rooms. Typically, each group of four pallets is spaced between 12 and 13 inches from the preceding group, and contains 1008 medicaments (252 tablets per pallet). This provides a throughput of from 60,000 to 90,000 medicaments per hour, assuming no waste.

The Reorientation Station

Figure 24:
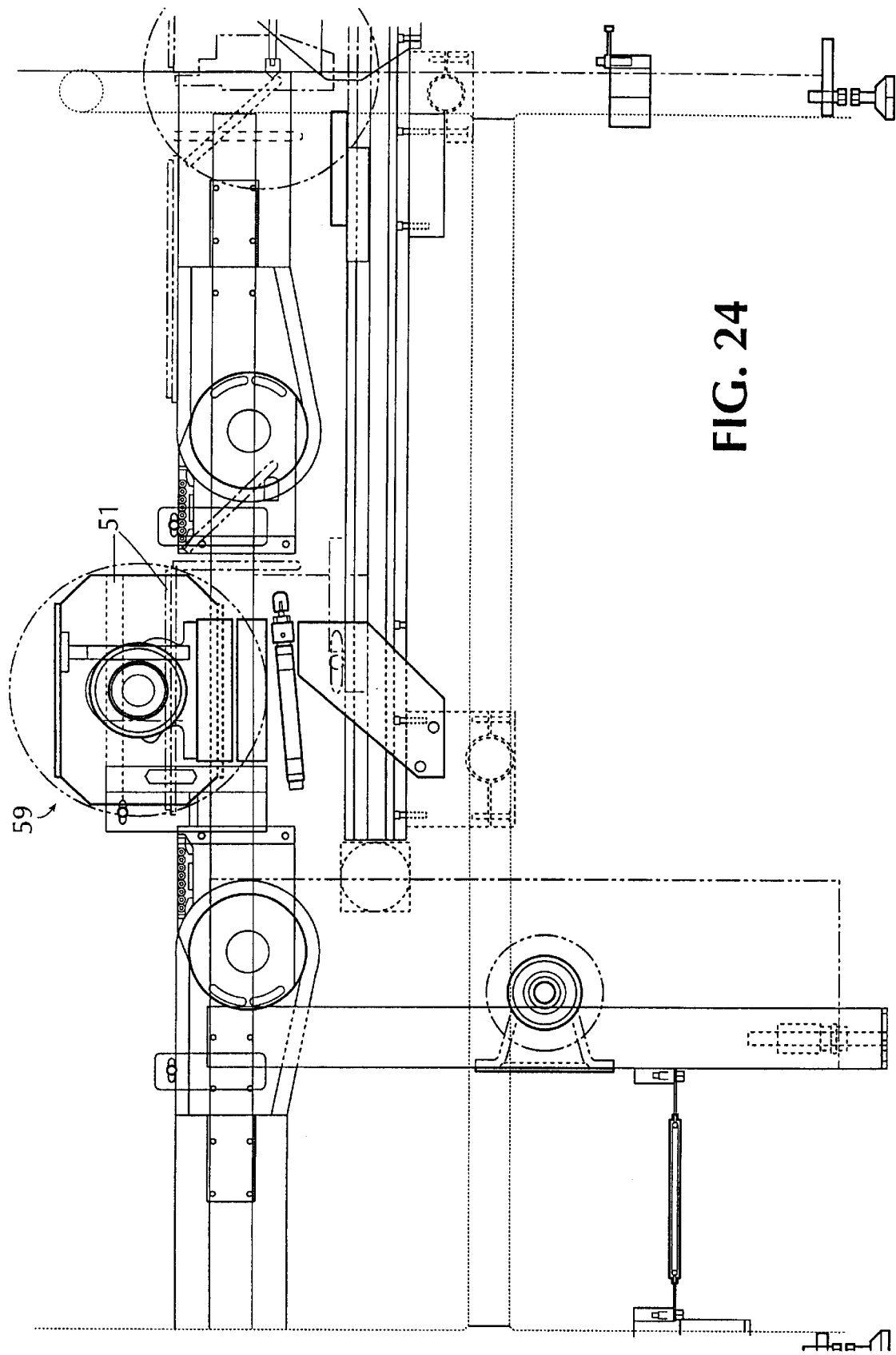
FIG. 24 is a side elevational view of the reorientation station of the present invention.
Figure 25:
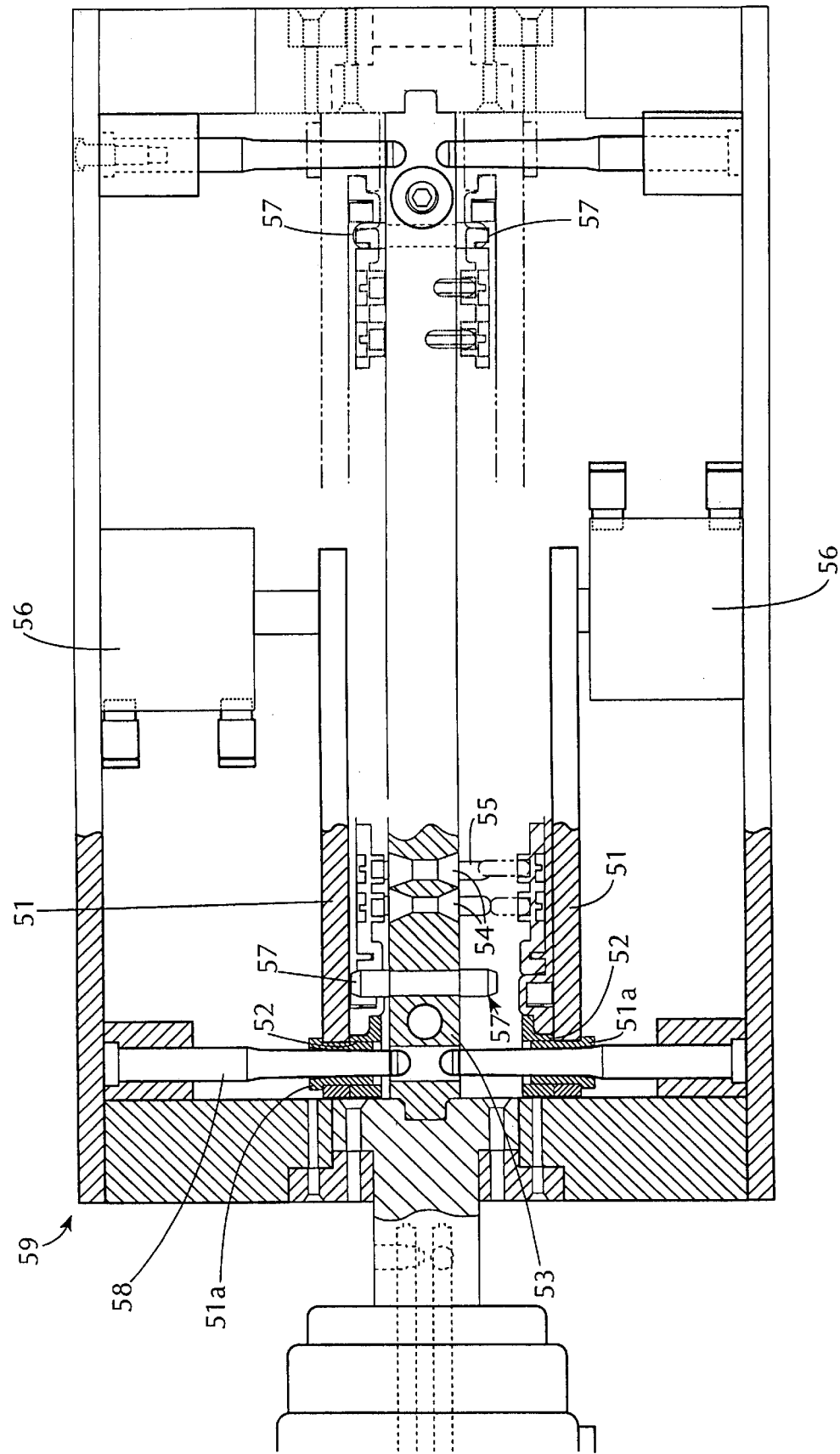
FIG. 25 is a front cross-sectional view of the reorientation station of FIG. 24 configured for caplets.
Figure 26:
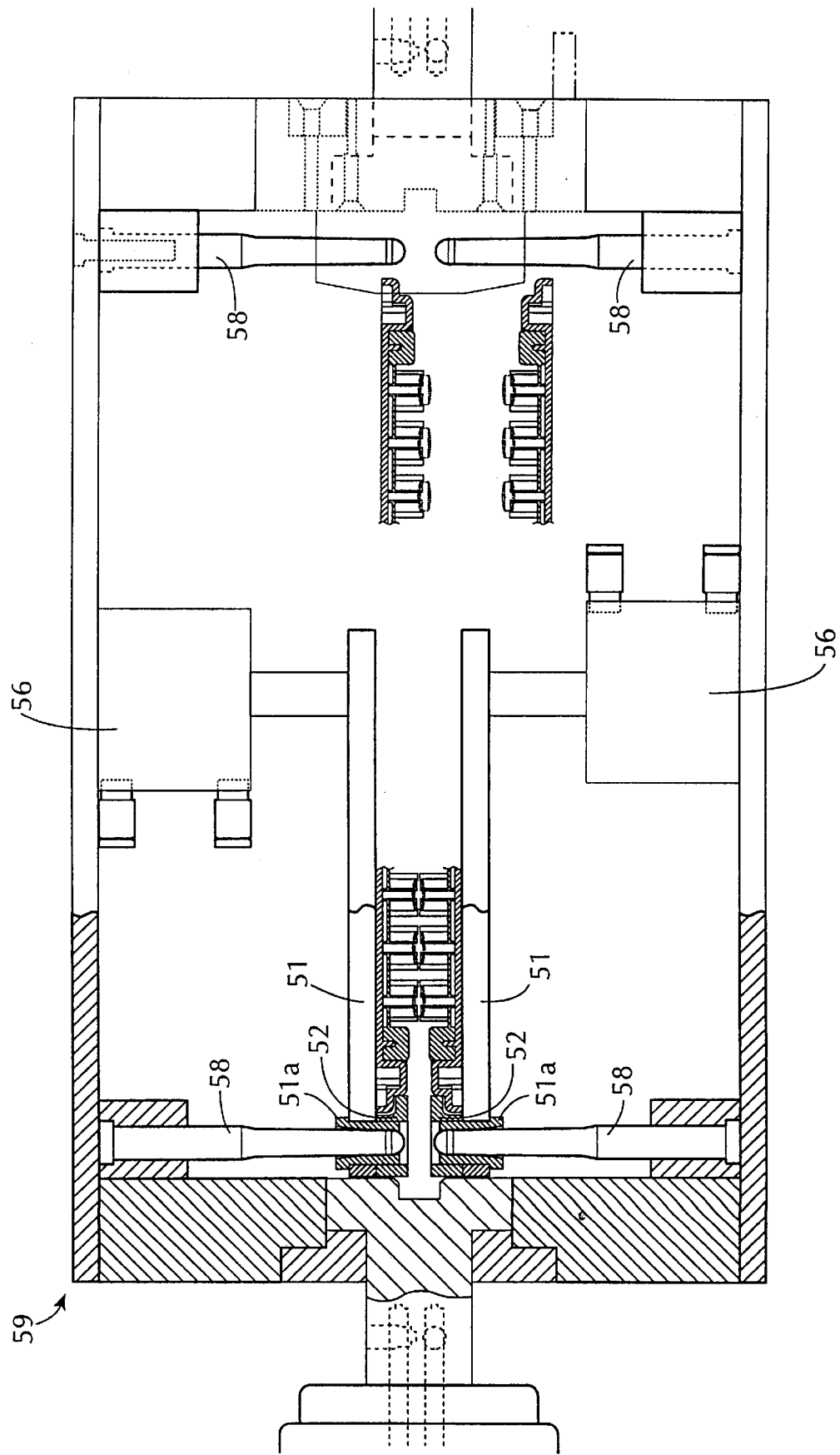
FIG. 26 is a front cross-sectional view of the reorientation station of FIG. 24 configured for tablets.

The reorientation station 50, which is illustrated in FIGS. 24–26, includes a reorientation mechanism 59 which is essentially a drum mounted to rotate about a horizontal axis. The rotation of the drum is driven by a pneumatic motor capable of clock wise and counter-clock wise rotation, which is connected by a toothed belt to the drum assembly and controlled by the computer system described below.

The reorientation mechanism 59 houses two lift plates 51 for receiving like pallets in opposition, and a transfer plate 53 interposed between the lift plates 51. Each lift plate is supported by four pilot rods 58 along which guide bushings 51*a* slide to allow vertical movement of the lift plates 51. Two pneumatic lift mechanisms 56 are secured to opposite sides of the body of the reorientation mechanism 59 with one lift mechanism 56 connected to each lift plate 51 so as to urge the lift plate vertically along the pilot rods 58. Each lift plate 51 also includes end rails 52, similar to the platform end rails 170 of the dipping station. The end rails 52 are mounted along the edges of the lift plates 51, parallel to the direction of pallet travel. Like end rails 170, end rails 52 include slots adapted to receive the edge 224 of the pallet support member 210.

The transfer plate 53 includes an array of apertures 54 which correspond to the medicament receptacles of the pallets for transferring the medicament from one pallet to the other. (See FIGS. 25–26). In addition, when coating caplets, the transfer plate 53 of the preferred embodiment, illustrated in FIG. 25, includes chamfered protrusions 55 similar to the chamfered ends 304 of the caplet drop tubes previously described. The chamfered protrusions 55 are located on both surfaces of the transfer plate adjacent to the apertures 54 in positions corresponding to the drop tube receiving compartments 274 in the caplet mats 270.

In operation, the pallet to be unloaded is indexed onto the reorientation mechanism 59 and secured to the lower lift plate 51 by end rails 52 by a stop and slide mechanism similar to that in the capture station 22 of the dipping station 20. An empty pallet is already located on the upper lift plate 51 in an inverted (i.e., medicament receptacles down) orientation. The loaded pallet is then urged against the transfer plate 53 by lift mechanism 56 and aligned with the empty pallet and the transfer plate 53 by way of alignment pins 57 which engage the corners of each pallet support member 210 at alignment holes 222 (see FIG. 3). When coating caplets according to the preferred embodiment, the chamfered protrusions 55 on either side of the transfer plate 53 contact the gripping ribs 282 of the caplet mats 270 at the drop tube receiving compartments 274 thereby causing the gripping ribs 282 (and consequently the caplet-holding compartments 272) in both pallets to spread open slightly. This allows for a larger target for the caplet to enter the empty pallet and eases the exit of the half coated caplet from the loaded pallet. It also can act to break a gelatin-mat seal, if one has formed.

The reorientation mechanism 59 is then rotated 180° in a first direction. As a result, the half-coated medicaments fall through the transfer plate apertures 54 into the empty pallet, which is now in the lower position, under the force of gravity. The now loaded pallet (located on the lower lift plate 51) is then moved away from the transfer plate 53 and pushed onto the conveyer by, e.g., a following loaded pallet to be unloaded. For the next pallet, the same sequence occurs except that the reorientation mechanism 59 rotates 180° in the other direction. The back and forth rotation is used for simplicity of hydraulic (pneumatic) and electronic control and wiring.

In coating different sized products, different transfer plates 53 may be required (e.g., 500 milligram caplets may require a transfer plate 53 with larger apertures 54 than 325 milligram caplets). For tablets, the transfer plate 53 may be omitted as shown in FIG. 26, in which case the two pallets are urged against each other in the reorientation mechanism prior to being inverted. Preferably, however, a relatively thin transfer plate (not shown) is used for tablets to ensure a centered transfer.

In the preferred embodiment, only the transfer plate 53 need be changed for different medicament products, rather than having to use multiple reorientation mechanisms 59. This saves time and makes it significantly easier to reconfigure the system in preparation for coating different products.

The Second Dipping Station

After reorientation, the pallet with the array of medicaments having their uncoated ends facing upwards is then transported by conveyer system 100 to a second dipping station 60. The second dipping station 60 operates in the same manner as the first dipping station 20, except that a different coating material may be applied. In the currently preferred embodiment, the second coating is either a white, red or yellow gelatin coating, depending on the size of the medication and whether one color or two color medicaments are desired. Optionally, a single dipping station may be used, for example, so as to coat the medicaments with a single color. Alternatively, two dipping vats 26 could be supplied from a single gelatin supply (tanks 80 and 90).

In the preferred embodiment, the medicaments are dipped into the gelatinous bath according to the profile listed in Tables 2 and 3 (above). At the first dipping station, caplets are dipped to a depth of approximately ½ the caplet length plus 0.015"–0.020" and at the second dipping station, they are dipped to a depth of approximately ½ the caplet length. The extent of dipping of each "half" can be controlled to achieve coverage which extends from no overlap between the first and second coating, to some overlap which is not visible to the eye and may not be felt, to a substantial overlap which provides a surface discontinuity which can be felt and/or seen.

It should be understood that the first and second dipping profiles can be selected to obtain the desired coating, ranging from no overlap, abutting coatings, and overlapped coatings. When combined with the viscosity of the gelatinous baths, the configuration and thickness profile of the gelatin coating on the medicaments can be selected as desired. For example, both coatings can be of the same viscosity and produce the same thickness.

The Second Pass through the Dryer Sections

After the second coating has been applied, the pallets are again advanced through both rooms 34 and 36 of the dryer station 30, this time passing through the second tunnel. The pallets travel in the same direction as occurred after the first coating and under the same conditions, again four pallets abreast at a time. At the exit 38 of the second dryer section 36, the medicaments are fully dried and ready for unloading. Before unloading, however, it may be desirable to subject the fully coated and dried medicaments to a curing step, the curing step being substantially identical to the conditioning that was employed after the subcoating was applied.

The Unloading Station

Figure 27:
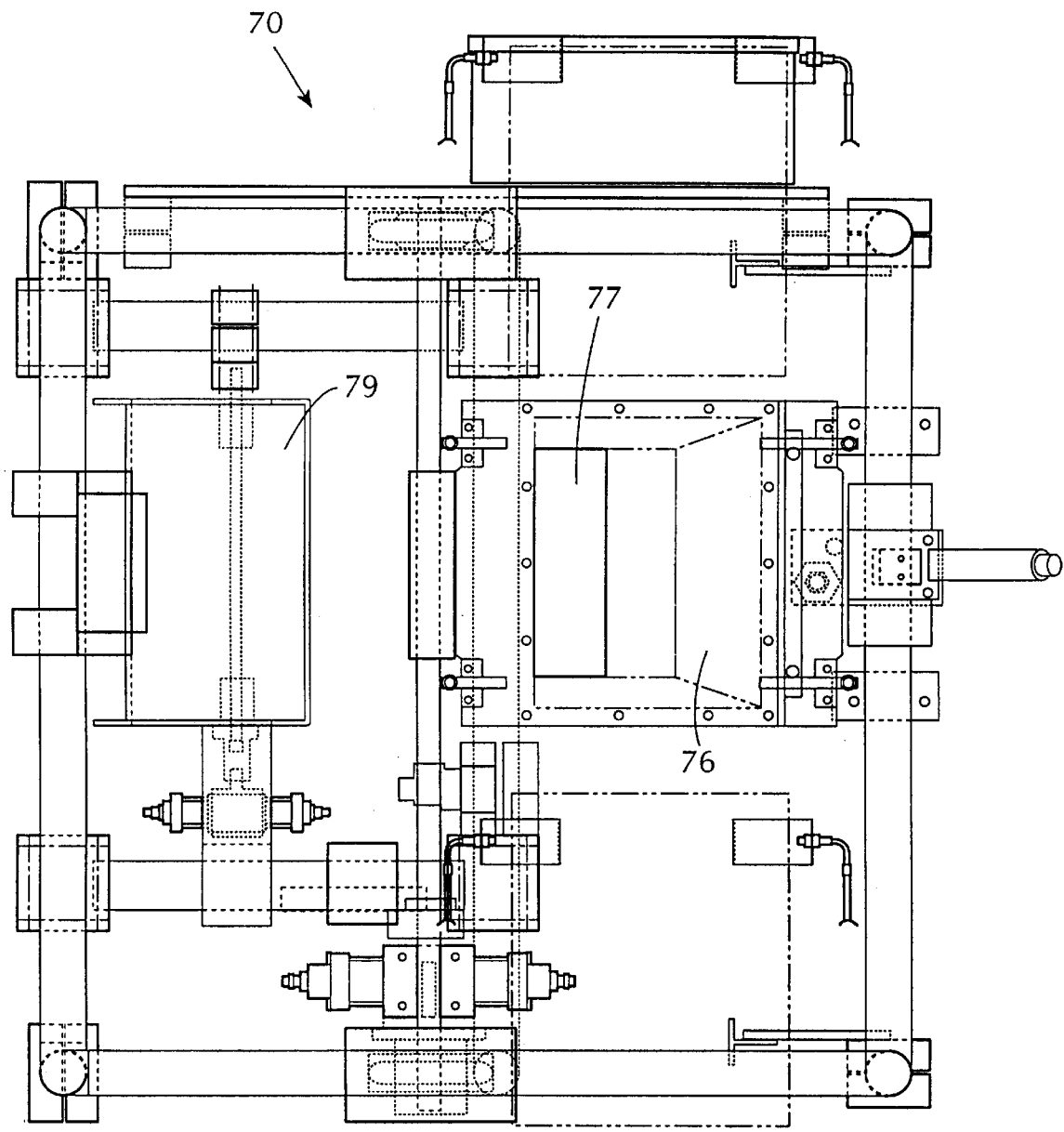
FIG. 27 is a top view of the unloading station of the present invention.
Figure 28:
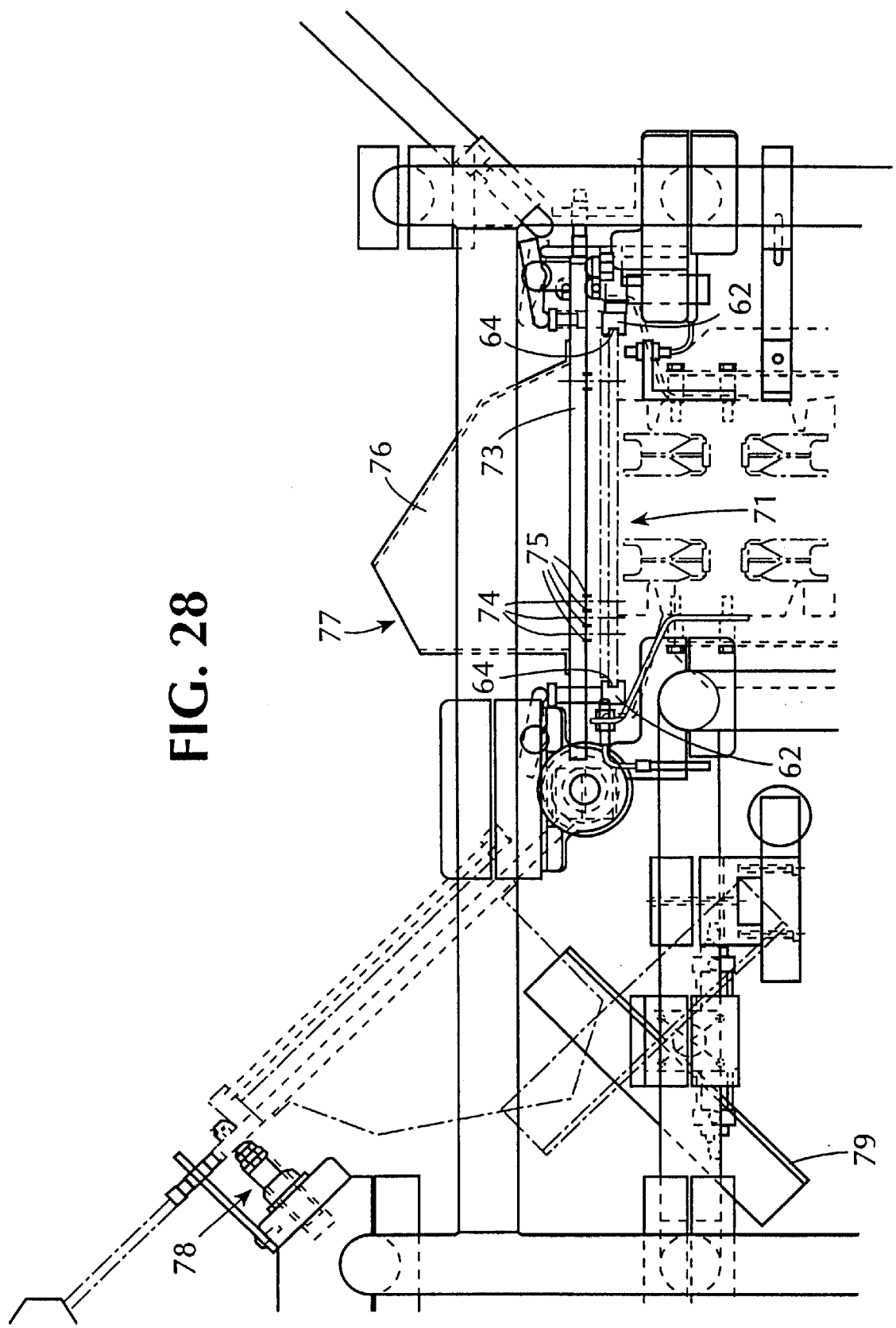
FIG. 28 is a side elevational view of the unloading station of FIG. 27.
Figure 29:
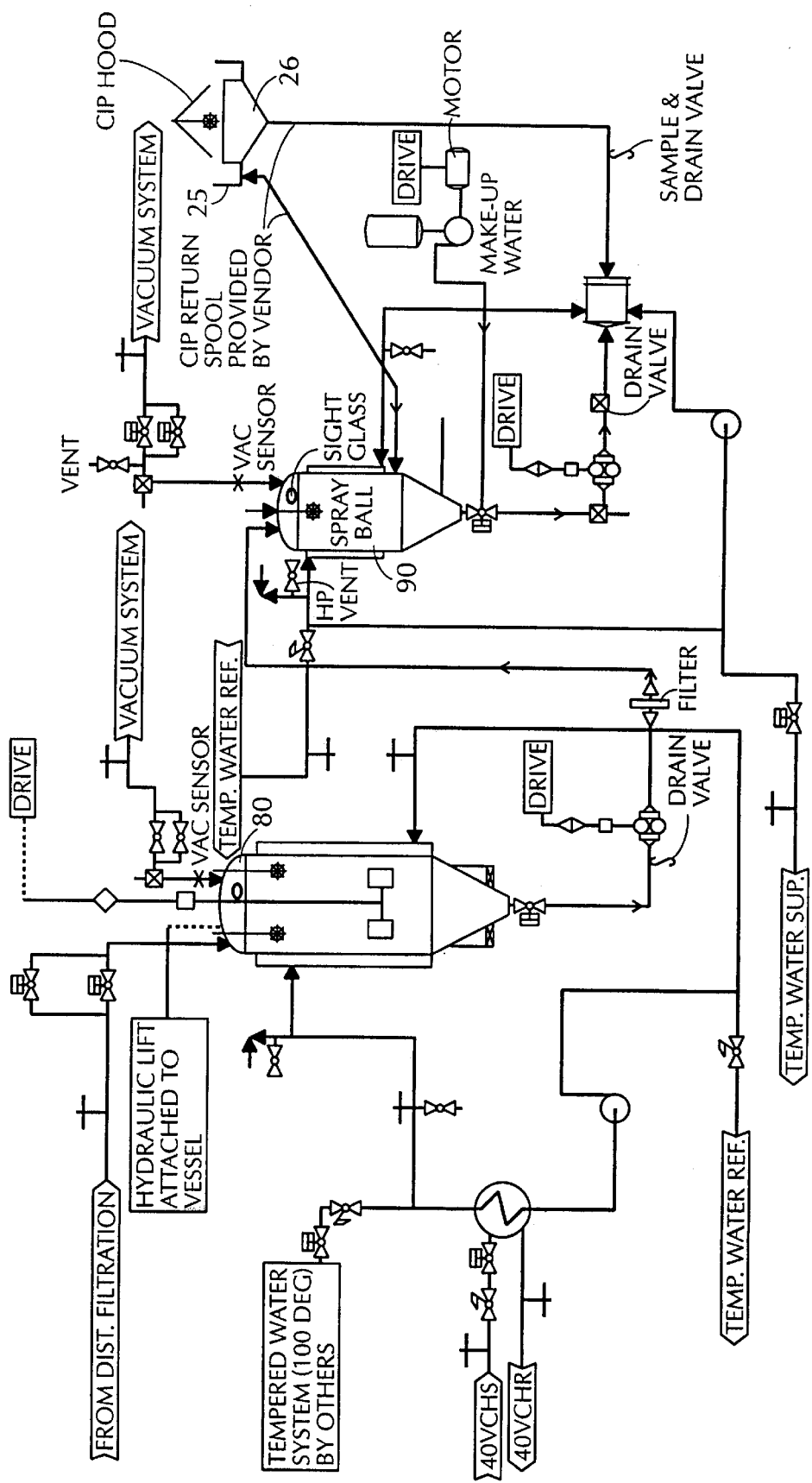
FIG. 29 is schematic process diagram of the automatic drawdown system (ADS) of the present invention.

Unloading preferably occurs one pallet at a time at station 70. The unloading station 70, illustrated in FIGS. 27 and 28, captures a pallet at capture station 71 and indexes it under an unloading plate 73 and unloading cone 76. Unloading plate 73 retains the mat 240 or 270 in its place against support member 210 as the pallet is inverted to discharge the coated medicaments into unloading cone 76.

In a preferred embodiment, the unloading cone 76 is connected to the unloading plate 73, such that they pivot about a common axis as the pallet of medicaments is raised from the capture station 71 and inverted. This minimizes the risk of ejecting the medicaments or having the medicaments fall out of the pallet so as to become waste during the unloading operation. The unloading cone 76 and unloading plate 73 are driven about the pivot axis by a pneumatically actuated motor capable of rotating clock wise and counter-clockwise.

In operation, a pneumatically actuated pallet stop allows the loaded pallets to enter the capture station 71 one at a time. The pallet entering the station slides in between two spring loaded carrier guides 62 which include slots 64 to engage the perimeter of the pallet in a similar manner to that in the reorientation station 50. Once the pallet is in the correct position, the motor is actuated to rotate the unload mechanism. Starting the rotation of the unload mechanism causes the two spring loaded carrier guides 62 to "pull up" the pallet so as to compress the pallet against the unloading plate 73. The pallet, along with the plate 73 and cone 76 are then flipped over to strike stop member 78. This angular momentum is thus rapidly decelerated, which ejects the coated medicaments into the unloading cone 76.

In one embodiment, the unloading plate 73 is similar to the transfer plate 53 previously described. Like the transfer plate 53, the unloading plate 73 may include a plurality of apertures 74 which correspond to the medicament receptacles of the pallets. In addition, when unloading caplets, the unloading plate 73 may include chamfered protrusions 75 (see, FIG. 28) in a similar arrangement to that found on the transfer plate 53. Unlike the transfer plate 53, however, the chamfered protrusions 75 of the unloading plate 73 are only required on one side, the side facing the pallet to be unloaded. In operation, the chamfered protrusions 75 on the unloading plate 73 contact the gripping ribs 282 of the caplet mat 270 at the drop tube receiving compartments 274, thereby causing the caplet-holding compartments 272 to spread open slightly. This breaks any adhesion formed between the gelatin and mat, and also allows the fully coated caplet to free-fall under the influence of gravity out of the pallet, minimizing the force used to rotate the pallet against the stop member 78.

In another embodiment, the unloading plate 73 has a mesh screen or grid which contacts a certain number of receptacles, but not every receptacle. For example, a grid that contacts every row and every third column of the pallet is suitable.

Once the fully coated medicaments are ejected from the inverted pallet into unloading cone 76, they fall through the opening 77 and onto a diverter 79 which directs the unloaded medicaments into either a collecting container or a refuse container. The diverter 79 is essentially a short chute which is rotatable between two positions, the first (shown in FIGS. 27 and 28) to direct the medicaments into the collecting container, and the other (shown in phantom in FIG. 28) to direct the medicaments into the refuse container. The diverter 79 is controlled by the computer system described below to selectively reject defective batches. Medicaments which are not rejected are collected in the collecting container and taken to be packaged as the finished product.

The now empty pallet is then returned to an upright orientation, the unloading plate 73 is raised and the pallet is pushed onto the next conveyor section 102, which was the initial starting position for the pallet. For the next pallet, the same sequence occurs. The unloaded pallets are transported to the loading station by the conveyer system 100 and the entire process is repeated.

The Automatic Drawdown System (ADS)

The ADS provides the two supplies of coating material, one for each dipping station. Referring to FIGS. 1 and 2a, a batch of coating material is first made in each of the large tanks 80, which is then transferred into the respective smaller holding tanks 90. Holding tanks 90 are continuous flow tanks that continuously feed the dipping vats 26. A holding tank 90 is periodically refilled from a large tank 80 whenever a new batch is provided or whenever another volume of coating material is needed to continue production. A clean-in-place system is used to clean out tanks 80 (including the associated piping, pumps and hoses) after a batch is made, and the whole dipping system (tanks 80 and 90, and vats 26) at the end of a production run.

In the preferred embodiment, the medicaments are coated with a gelatinous material. The gelatinous material includes water, gelatin, glycerin, a plasticizer, a surfactant and preservatives. The currently preferred gelatin formulations, along with the tested ranges, are given below in Table 4, with the balance of the mixture in each case being made up of purified water.

It should, of course, be understood that one of ordinary skill in the art of gelatin use in the pharmaceutical industry would be able to determine equivalents without undue experimentation, given the disclosure provided. For example, other known plasticizers, such as polyethylene, glycols, triacetin, mineral oil or caster oil, may be used in place of titanium dioxide. Likewise, other known surfactants, such as Span or Tween, may be used instead of sodium lauryl sulfate. Further, as indicated in Table 4, various dyes may be added to impart color to the gelatin.

TABLE 4

GEL FORMULATIONS

| | % of RM | | | | |
|---|---|---|---|---|---|
| Raw Material | Tested Range | Preferred Range | Red Gelatin | White Gelatin | Yellow Gelatin |
| Gelatin | 25–40 | 28–30 | 29.16 | 29.16 | 29.17 |
| Glycerin | 2–10 | 4 | 3.65 | 3.65 | 3.65 |
| FD&C Red | | | 1.82 | | |
| FD&C Yellow | | | | | .83 |
| Titanium Dioxide | 1–3.5 | 1.5 | 1.37 | 1.37 | 1.37 |
| Sodium Lauryl Sulfate | .2–.6 | .3 | .27 | .27 | .27 |
| Methylparaben | 0–.44 | | .44 | .44 | .44 |

TABLE 4-continued

GEL FORMULATIONS

| | % of RM | | | | |
|---|---|---|---|---|---|
| Raw Material | Tested Range | Preferred Range | Red Gelatin | White Gelatin | Yellow Gelatin |
| Propylparaben | 0–.04 | | .04 | .04 | .04 |
| Butylparaben | 0–.02 | | .02 | .02 | .02 |

The process for making the gelatin is computer controlled with operator inputs required. Water is added to tank 80, along with the gelatin, coloring, preservatives, and other materials, as indicated. The gelatin is hydrated and mixed under a vacuum of about 29 inches of mercury for thirty minutes. The heat is then turned on to melt the hydrated gelatin at a temperature of 104° to 108° F. for approximately forty-five minutes, being careful not to boil the solution.

After the melting, the vacuum is broken and tank 80 is heated to a temperature below 140° F., preferably between 120° and 130° F. Once the temperature matches that of the smaller holding tank 90, the batch is transferred into the holding tank 90. The holding tank 90 continues to circulate the warm gelatin into the dipping vat 26 through feed valve 27 located near the bottom of dipping vat 26. Overflow is captured by overflow vat 25 and returned to tank 90 via gravity and vacuum assist to be mixed with the rest of the batch. This arrangement maintains a constant gelatin level in dipping vat 26 and provides for uniform gelatin consistency. Tank 90 is maintained at a low vacuum, about 30 inches of water, in order to degas the circulating gelatin. Heat exchangers are used to maintain temperature and a peristaltic pump (not shown) is used to inject water to compensate for water loss due to evaporation.

Computer Control

A network of Man Machine Interface (MMI) industrial computers are used to monitor and control the operation of the entire system. Each computer is allowed to directly control the apparatus within a local area, i.e., within the operator's field of view, and otherwise is capable of monitoring all other systems operating conditions. This allows an operator to view what is going on in a different room, but not to control it.

Each pallet is provided with a bar code or other identifying indicia, which is scanned as the pallet enters each station. This provides the system with the ability to monitor the process and track and identify any problem that may occur at the various processing stations. Thus, if a given step in the process is defective, when the pallet gets to the unloading station, the diverter 79 is actuated to divert the unloaded medicaments into a separate waste container. Similarly, if there was a detected problem with some other part of the process that is out of tolerances for the process, then certain subsequent process steps will be skipped. For example, if there was a problem with the first dipping station 20, then the pallet will not be reoriented or dipped a second time, but it will be unloaded and the contents diverted as waste. Indeed, the pallet may pass directly through the reorientation station 50 if so desired. Further, appropriate programming and scanning of bar codes can allow one robot 24 to be used to dip the pallets in the appropriate one of two or more dipping vats 26.

The present invention has been described in terms of preferred embodiments thereof. Other embodiments, features and variations within the scope of the invention will, given the benefit of this disclosure, occur to those having ordinary skill in the art.

What is claimed is:

1. An apparatus for transferring a plurality of medicaments from a first pallet to a second pallet thereby reorienting said medicaments, said apparatus comprising:
   a first pallet support for receiving and retaining said first pallet;
   a second pallet support for receiving and retaining said second pallet above said first pallet in an inverted orientation;
   a lift mechanism for urging said first and said second pallet supports towards one another;
   transfer guide means for guiding the transfer of said medicaments, said transfer guide means being disposed between said first and second pallets and having a plurality of transfer apertures, each transfer aperture being disposed to correspond to the location of one of said medicaments on said first pallet;
   alignment means for engaging said first and second pallets and aligning said first and second pallets with said transfer guide means; and
   means for inverting said first and second pallet supports such that medicaments disposed on said first pallet are transferred to said second pallet.

2. The apparatus of claim 1 wherein said inverting means comprises a motor capable of rotation in two directions.

3. An apparatus for transferring a plurality of medicaments from a first pallet to a second pallet thereby reorienting said medicaments, said apparatus comprising:
   first receiving means for receiving said first pallet;
   second receiving means for receiving said second pallet disposed in vertical opposition to said first receiving means;
   means for urging said first and said second receiving means towards one another;
   transfer guide means for guiding the transfer of said medicaments, said transfer guide means being disposed between said first and second receiving means;
   alignment means for engaging said first and second pallets and aligning said first and second pallets with said transfer guide means; and
   means for inverting said first and second receiving means so that said medicaments are transferred from said first pallet to said second pallet.

4. The apparatus of claim 3 wherein said transfer guide means has a plurality of transfer apertures, each transfer aperture being disposed to correspond to the location of one of said medicaments on said first pallet.

5. The apparatus of claim 4 wherein said transfer guide means further comprises engagement means for engaging a plurality of medicament receptacles on one of said first and second pallets.

6. The apparatus of claim 3 wherein said means for urging said first and said second receiving means towards one another comprises at least one pneumatic lift.

7. The apparatus of claim 6 wherein said means for urging said first and said second receiving means towards one another comprises a first pneumatic lift operably engaged to said first receiving means and a second pneumatic lift operably engaged to said second receiving means.

8. An apparatus for transferring a plurality of medicaments from a first pallet to a second pallet thereby reorienting said medicaments, said apparatus comprising:
   a first lift plate for receiving said first pallet;
   a second lift plate for receiving said second pallet disposed in vertical opposition to said first lift plate;
   a lift mechanism for urging said first and said second lift plates towards one another;
   transfer guide means for guiding the transfer of said medicaments, said transfer guide means being disposed between said first and second lift plates;
   alignment means for engaging said first and second pallets and aligning said first and second pallets with said transfer guide means; and
   means for inverting said first and second lift plates so that said medicaments are transferred from said first pallet to said second pallet.

9. The apparatus of claim 8 wherein said transfer guide means has a first surface, a second surface and a plurality of transfer apertures, each transfer aperture being disposed to correspond to the location of one of said medicaments on said first pallet.

10. The apparatus of claim 8 wherein said lift mechanism comprises at least one pneumatic lift.

11. The apparatus of claim 10 wherein said lift mechanism comprises a first pneumatic lift operably engaged to said first lift plate and a second pneumatic lift operably engaged to said second lift plate.

12. The apparatus of claim 8 wherein said means for inverting said first and second lift plates comprises means for rotating said first and second lift plates 180° in a first direction.

13. The apparatus of claim 12 wherein said means for inverting said first and second lift plates further comprises means for rotating said first and second lift plates 180° in a second direction.

14. An apparatus for transferring a plurality of medicaments from a first pallet to a second pallet thereby reorienting said medicaments, said apparatus comprising:
   a first lift plate for receiving said first pallet;
   a second lift plate for receiving said second pallet disposed in vertical opposition to said first lift plate;
   a lift mechanism for urging said first and said second lift plates towards one another; and
   means for inverting said first and second lift plates so that said medicaments are transferred from said first pallet to said second pallet;
   a transfer plate disposed between said first lift plate and said second lift plate, said transfer plate having a first surface, a second surface and a plurality of transfer apertures, each transfer aperture being disposed to correspond to the location of one of said medicaments on said first pallet;
   wherein said transfer plate further comprises a plurality of chamfered protrusions mounted adjacent to said transfer apertures on at least one of said first and second surfaces, said chamfered protrusions being adapted to engage a plurality of medicament receptacles on one of said first and second pallets.

15. A method for transferring a plurality of medicaments to a first pallet from a second pallet thereby reorienting said medicaments, said method comprising:
   receiving and retaining said first pallet on a first pallet support in an inverted orientation;
   receiving and retaining said second pallet on a second pallet support under said first pallet;
   urging said first and said second pallet supports towards one another; and
   inverting said first and second pallet supports so that said medicaments disposed on said second pallet are transferred to said first pallet;

wherein the step of urging said first and said second pallet supports towards one another comprises urging said first and said second pallet supports towards a transfer plate disposed between said first and second pallets; and wherein said transfer plate further comprises a plurality of chamfered protrusions, and wherein said step of urging said first and second pallet supports towards said transfer plates comprises causing, said chamfered protrusions to engage a plurality of medicament receptacles on one of said first and second pallets.

16. The method of claim 15 wherein the step of inverting said first and second pallet supports comprises rotating said first and second pallet supports 180° in a first direction.

* * * * *